US007823673B2

(12) United States Patent
Asogawa

(10) Patent No.: US 7,823,673 B2
(45) Date of Patent: Nov. 2, 2010

(54) VARIABLE WHEEL POSITIONING VEHICLE

(75) Inventor: Katsunori Asogawa, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 382 days.

(21) Appl. No.: 11/849,483

(22) Filed: Sep. 4, 2007

(65) Prior Publication Data

US 2008/0073138 A1 Mar. 27, 2008

(30) Foreign Application Priority Data

Sep. 22, 2006 (JP) .............................. 2006-256633
Aug. 7, 2007 (JP) .............................. 2007-204885

(51) Int. Cl.
*B62D 61/00* (2006.01)
*B62D 61/12* (2006.01)

(52) U.S. Cl. ........................... 180/209; 180/21; 180/24; 180/24.08; 180/234; 180/236; 180/237; 180/238; 180/245; 180/252; 180/253; 180/268; 180/65.51; 180/282; 280/5.52; 280/43.15; 280/43.16

(58) Field of Classification Search ................... 180/7.1, 180/8.2, 21, 24, 24.08, 234–238, 209, 252, 180/253, 65.5, 282; 280/5.52, 43.16
See application file for complete search history.

(56) References Cited

U.S. PATENT DOCUMENTS

| 2,559,935 | A |   | 7/1951 | Brown |         |
|-----------|---|---|--------|-------|---------|
| 3,016,966 | A | * | 1/1962 | Hansen | 180/337 |
| 3,899,037 | A | * | 8/1975 | Yuker  | 180/6.48 |
| 4,049,138 | A | * | 9/1977 | Soyland | 414/687 |
| 5,769,510 | A | * | 6/1998 | Akuzawa et al. | 303/188 |
| 5,927,423 | A | * | 7/1999 | Wada et al. | 180/209 |
| 6,065,556 | A | * | 5/2000 | Andrews | 180/209 |
| 6,199,769 | B1 | * | 3/2001 | Weddle | 239/172 |

(Continued)

FOREIGN PATENT DOCUMENTS

GB            2402658 A         12/2004

(Continued)

OTHER PUBLICATIONS

Toyoda & Nonaka; Tracking Control of Mobile Robots with Redundant Multiarticular Legs; 9th Symposium; Aug. 23-25, 2007; The Japan Society of Mechanical Engineers, Tokyo, Japan.

*Primary Examiner*—Paul N Dickson
*Assistant Examiner*—James English
(74) *Attorney, Agent, or Firm*—Global IP Counselors, LLP

(57) ABSTRACT

A variable wheel positioning vehicle has a wheel position changing mechanism and a wheel position control device to change a wheel position of a wheel with respect to a center of gravity of a vehicle body. The wheel position changing mechanism is arranged to move a suspension device along a movement path with respect to the vehicle body and to hold the suspension device at any position along the movement path. The wheel position control device issues a movement command to the wheel position changing mechanism that changes a wheel positioning distance between a center rotation axis of one of the wheels and the center of gravity of the vehicle body as measured in a direction parallel to an acceleration direction of the center of gravity of the vehicle body based on a traveling condition the vehicle.

17 Claims, 33 Drawing Sheets

U.S. PATENT DOCUMENTS

| | | | |
|---|---|---|---|
| 6,311,795 B1 * | 11/2001 | Skotnikov et al. | 180/8.3 |
| 6,408,230 B2 * | 6/2002 | Wada | 701/1 |
| 6,948,578 B2 * | 9/2005 | Prucher | 180/65.51 |
| 7,338,061 B2 * | 3/2008 | Bullis | 280/419 |
| 7,426,970 B2 * | 9/2008 | Olsen | 180/65.1 |
| 7,527,117 B2 * | 5/2009 | Strong | 180/209 |
| 7,690,448 B2 * | 4/2010 | Yamanaka et al. | 180/23 |

FOREIGN PATENT DOCUMENTS

| | | |
|---|---|---|
| JP | 2005-231452 A | 9/2005 |
| WO | WO-89/03336 A1 | 4/1989 |
| WO | WO-2006/112732 A1 | 10/2006 |

* cited by examiner

VARIABLE WHEEL POSITIONING VEHICLE

CROSS-REFERENCE TO RELATED APPLICATIONS

This application claims priority to Japanese Patent Application No. 2006-256633, filed on Sep. 22, 2006 and Japanese Patent Application No. 2007-204885, filed on Aug. 7, 2007. The entire disclosures of Japanese Patent Application Nos. 2006-256633 and 2007-204885 are hereby incorporated herein by reference.

BACKGROUND OF THE INVENTION

1. Field of the Invention

The present invention relates to vehicles having variable wheel positioning, i.e., vehicles constructed such that the positions of the wheels of the vehicle can be changed.

2. Background Information

Various vehicles or mobile robots have been proposed that use multi articular legs with regular tires to travel in order to improve the behavioral stability of the vehicle. In this type of vehicle, a variable wheel base is provided in order to achieve both convenience and behavioral stability. An example of this type of a vehicle is disclosed in "Tracking Control of Mobile Robots with Redundant Multiarticular Legs," by Masahiro Toyoda, The Japan Society of Mechanical Engineers, Journal of 9th Symposium on Motion and Vibration Control, No. 05-15, Niigata, 23 to 25 Aug. 2005 (also see, Hyperlink: http://www.cl.mes.musashi-tech.acjp/abstracts/kawamura.htm). The technology described in this first publication is very complex. Another example of this type of a vehicle is disclosed in Japanese Laid-Open Patent Publication No. 2005-231452. The technology described in this second publication can vary only the wheel base.

In view of the above, it will be apparent to those skilled in the art from this disclosure that there exists a need for an improved vehicle having a variable wheel positioning mechanism. This invention addresses this need in the art as well as other needs, which will become apparent to those skilled in the art from this disclosure.

SUMMARY OF THE INVENTION

It has been discovered that in the technology of the first above mentioned publication is difficult to apply to an actual vehicle because the multi articular legs tend to cause the structure to become large and complex. Meanwhile, in the technology of the second above mentioned publication, the second technology is able to improve the convenience of the vehicle over the technology of the first above mentioned publication because it can vary only the wheel base. However, the technology of the second above mentioned publication leaves room for further improvement of the behavioral stability of the vehicle.

The present invention was conceived in view of these issues. One object is of the present invention is to provide a variable wheel positioning vehicle that is simple in structure, that serves to improve both the convenience and the behavioral stability of the vehicle, and that achieves a higher degree of freedom with respect to vehicle behavior.

In order to achieve the aforementioned object, a variable wheel positioning vehicle in accordance with the present invention basically comprises a vehicle body, a plurality of wheels, a suspension device, a steering mechanism, a drive device, a wheel position changing mechanism and a wheel position control device. The vehicle body has a center of gravity. The wheels are rotatably mounted with respect to the vehicle body. The suspension device is operatively arranged between the wheels and the vehicle body. The steering mechanism is operatively coupled to the suspension device to change a direction of at least one of the wheels with respect to the vehicle body. The drive device is operatively coupled to drive at least one of the wheels. The wheel position changing mechanism is operatively coupled to the suspension device to move the suspension device along a movement path with respect to the vehicle body and to hold the suspension device at any position along the movement path. The wheel position control device is operatively coupled to the wheel position changing mechanism to issue a movement command to the wheel position changing mechanism that changes a wheel positioning distance between a center rotation axis of one of the wheels and the center of gravity of the vehicle body as measured in a direction parallel to an acceleration direction of the center of gravity of the vehicle body based on a traveling condition the vehicle.

This object and/or other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1A:
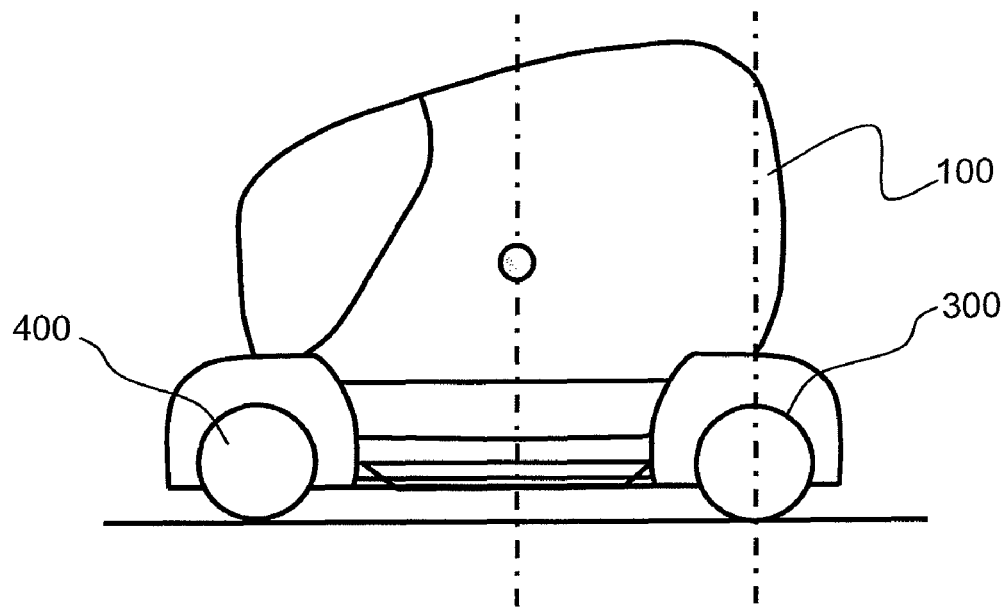
FIG. 1A is a simplified side elevational view of an external appearance of a variable wheel positioning vehicle with variable wheel geometry in accordance with a first embodiment.
Figure 1B:
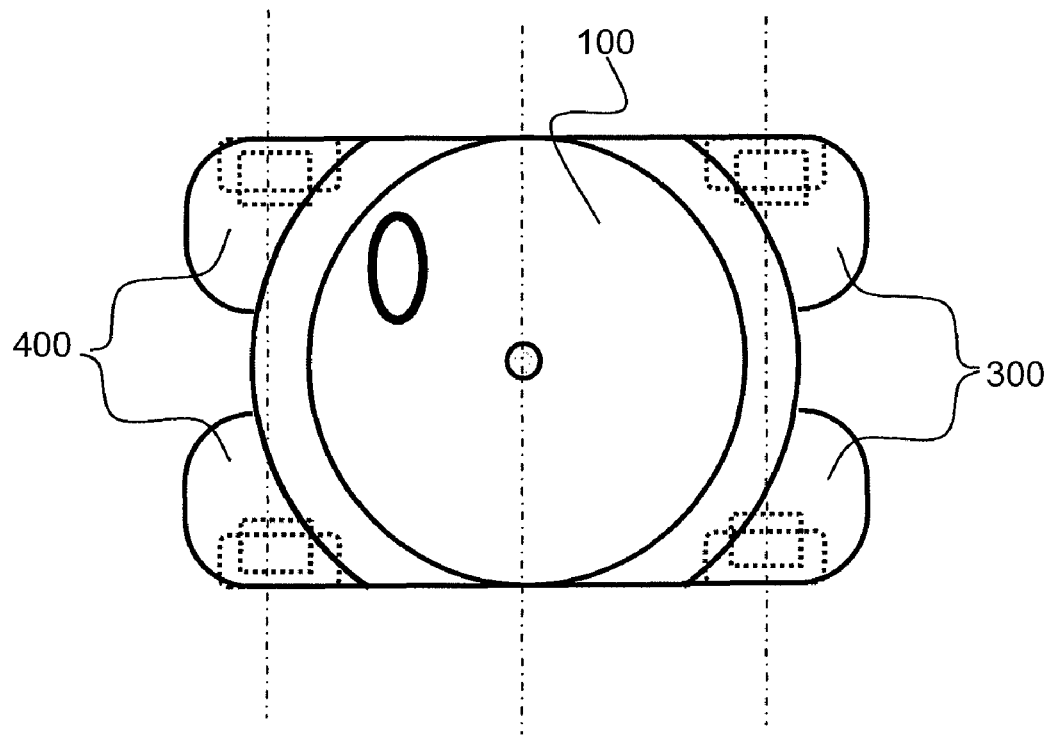
FIG. 1B is top plan view of the external appearance of the variable wheel positioning vehicle illustrated in FIG. 1A in accordance with the first embodiment.

Referring initially to FIGS. 1A and 1B, a variable wheel positioning vehicle is illustrated in accordance with a first embodiment of the present invention. FIGS. 1A and 1B show the external appearance of the variable wheel positioning vehicle in accordance with the first embodiment. The vehicle basically includes a vehicle body 100, a pair of non-drive wheel units 400 provided on a lower portion of the vehicle body 100, and a pair of drive wheel units 300 provided on a lower portion of the vehicle body 100. Hereinafter, variable positioning of the wheels with respect to the vehicle body will be called "variable wheel geometry."

Figure 2:
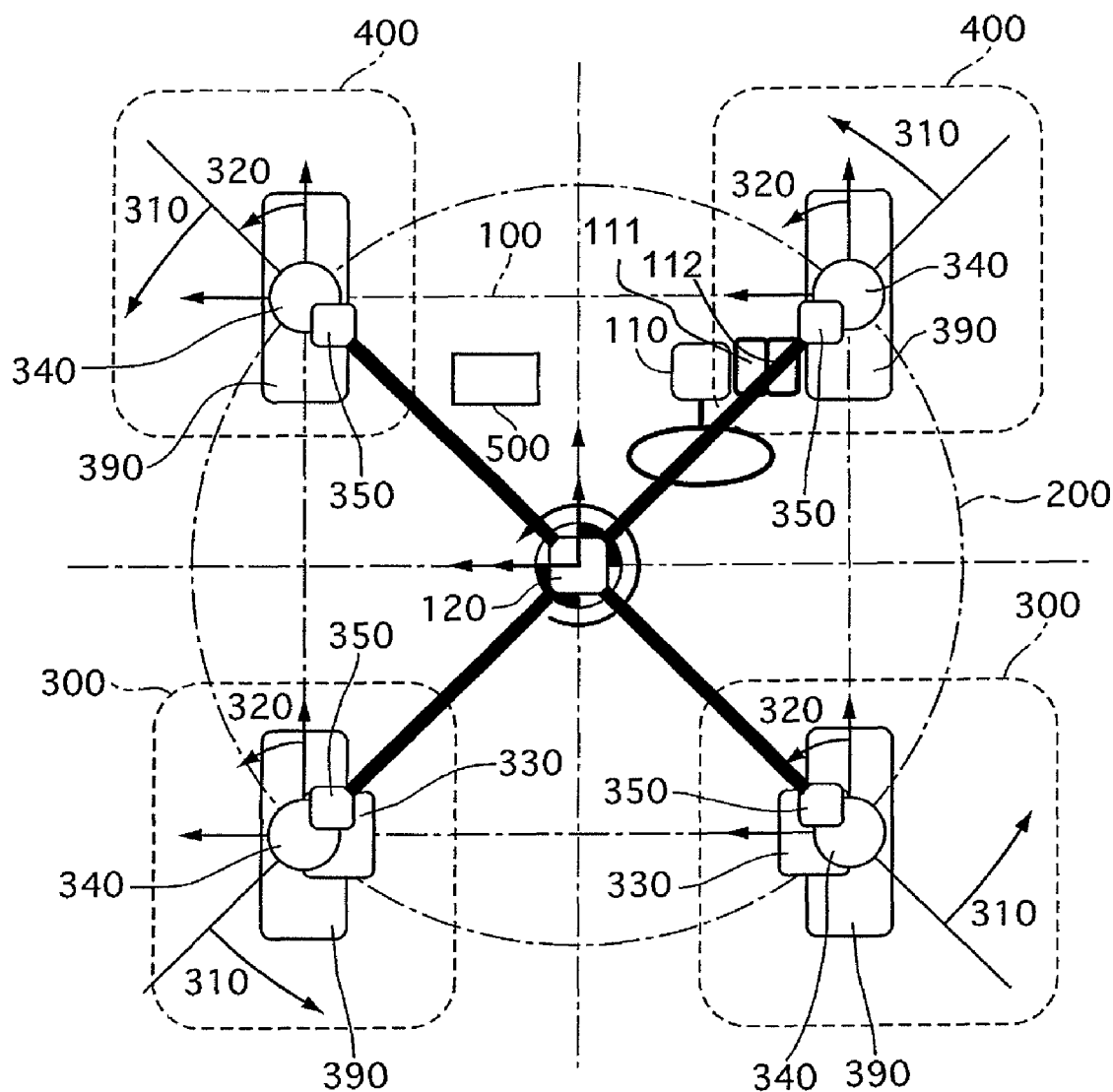
FIG. 2 is a schematic top plan view of the variable wheel positioning vehicle with the variable wheel geometry in accordance with the first embodiment.

FIG. 2 is a top plan view of the vehicle with variable wheel geometry in accordance with the first embodiment. The vehicle with variable wheel geometry in accordance with the first embodiment further includes a steering angle sensor 110, an accelerator position sensor 111, a brake sensor 112, an acceleration and yaw rate sensor (acceleration vector detecting device) 120, a pair of drive wheel units 300, a plurality of wheel unit position sensors 310 (one per wheel), a plurality of steered angle sensors 320 (one per wheel to detect angle to which the wheel is steered), a pair of drive actuators 330, a plurality of steering actuators (wheel turning device) 340 (one per wheel), a plurality of track width and wheelbase changing actuators (wheel position changing device) 350 (one per wheel), a pair of wheels 390, a pair of non-drive wheel units 400, a controller (geometry control device) 500. In the vehicle with variable wheel geometry in accordance with the first embodiment, the non-drive wheel units 400 are arranged as the left and right front wheels and the drive wheel units 300 are arranged as the left and right rear wheels.

The steering angle sensor 110 detects the amount (steering angle) by which a driver is turning the steering wheel. The accelerator position sensor 111 detects the amount by which the driver is operating the accelerator. The brake sensor 112 detects the amount by which the driver is operating the brake. The accelerator and yaw rate sensor 120 detects the acceleration and yaw rate of the vehicle. Each of the wheel unit position sensors 310 detects a position of the corresponding drive wheel unit 300 or non-drive wheel unit 400 along a wheel unit movement path 200. Each of the steered angle sensors 320 detects a steered angle of the corresponding wheel 390 (i.e., the angle to which the wheel 390 is turned with respect to the forward direction of the vehicle).

A corresponding one of the drive actuators 330 is provided on each of the drive wheel units 300 and serves to drive the corresponding wheel 390. In-wheel motors, for example, can be used as the drive actuators 330.

The steering actuators 340 are provided on the drive wheel units 300 and the non-drive wheel units 400 and serve to change the steered angle of the corresponding wheel 390. Electric motors, for example, can be used as the steering actuators 340.

Each of the track width and wheelbase changing actuators 350 serves to move the corresponding drive wheel unit 300 or non-drive wheel unit 400 along the wheel unit movement path 200. The track width and wheelbase changing actuators 350 are controlled by the controller 500. The wheel unit movement path 200 is configured to be a horizontal circle centered at the center of gravity of the vehicle such that the wheels 390 are moved along a single annular movement path centered at the center of gravity. The structure employed to achieve the wheel unit movement path 200 will be explained later.

The controller 500 drives the drive actuators 330 in accordance with the accelerator pedal position and the vehicle speed and, thereby, controls the vehicle speed. The controller 500 also drives the steering actuators 340 in accordance with signals from the steering angle sensor 110, the acceleration and the yaw rate sensor 120 and, thereby, controls the direction in which the vehicle travels.

Based on the vehicle speed and signals from the steering angle sensor 110, the accelerator position sensor 111, the brake sensor 112, the acceleration and yaw rate sensor 120, and the wheel unit position sensors 310, the controller 500 also drives the track width and wheelbase changing actuators 350 so as to change the wheel positions and obtain a target track width, a target wheel base, and a target wheel load for each of the wheels. The target values are determined based on the traveling condition or traveling state of the vehicle.

Figure 3A:
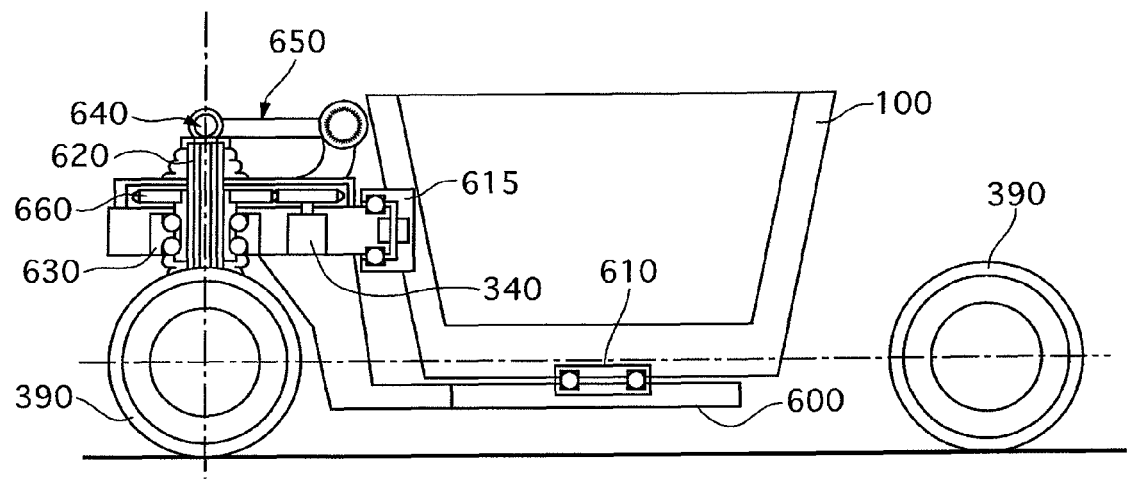
FIG. 3A is a simplified side view (selected portions shown in cross section) of a wheel mounting structure for the variable wheel positioning vehicle in accordance with the first embodiment.
Figure 3B:
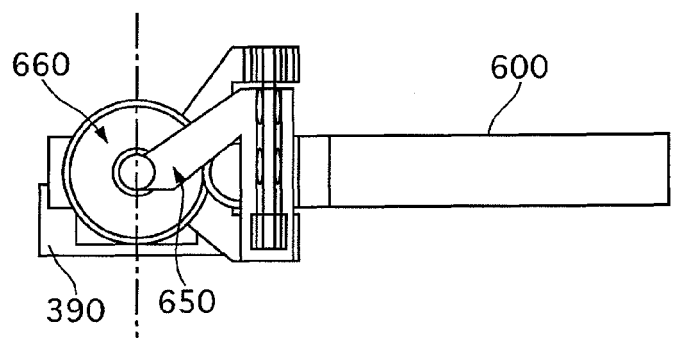
FIG. 3B is a simplified top view of selected portions shown of the wheel mounting structure for the variable wheel positioning vehicle in accordance with the first embodiment.

Referring to FIGS. 3A and 3B, each of the wheels 390 is connected to the vehicle body 100 through a suspension frame 600. The suspension frame 600 is mounted to a bottom surface of the vehicle body 100 (or a bottom surface of another suspension frame) with a bearing 610. A linear motor and slider arrangement 615 is provided in an annular shape along a middle section of the sides of the vehicle body 100. Thus, the suspension frame 600 is supported such that it can be rotated with respect to the vehicle body 100. The linear motor and slider arrangement 615 of the first embodiment corresponds to the track width and wheelbase changing actuators 350 shown in FIG. 2 and serves to move the wheels 390 relative to the vehicle body 100 using the horizontally oriented driving power of the linear motor.

A steering shaft of each wheel 390 is supported on the suspension frame 600 with a rod 620 and a bearing 630 that is arranged at a middle portion of the rod 620. An upper end portion of the rod 620 is supported on a suspension arm 650 with a ball joint 640. The suspension arm 650 is arranged such that it can pivot in a vertical direction with respect to the suspension frame 600. A steering gear 660 is connected to each of the rods 620. The wheels 390 are steered by driving the steering actuators 340, which are fixed to the suspension frame 600.

Figure 4A:
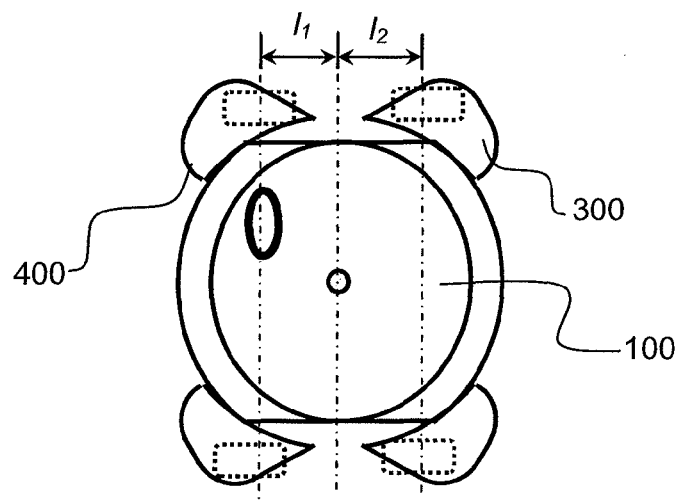
FIG. 4A shows a first variation of the track width and wheelbase for the variable wheel positioning vehicle in accordance with the first embodiment.
Figure 4B:
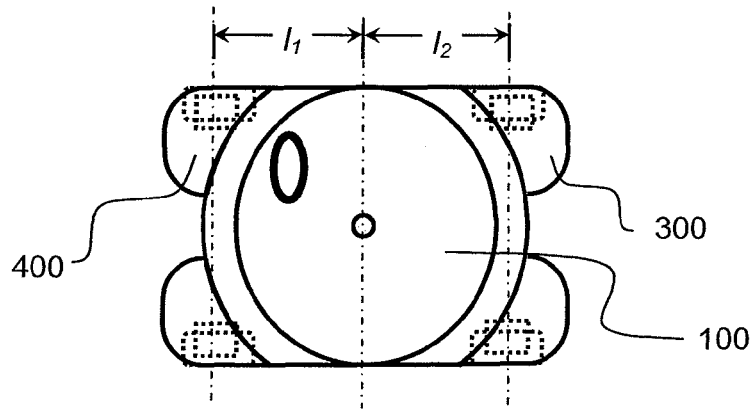
FIG. 4B shows a second variation of the track width and wheelbase for the variable wheel positioning vehicle in accordance with the first embodiment.
Figure 4C:
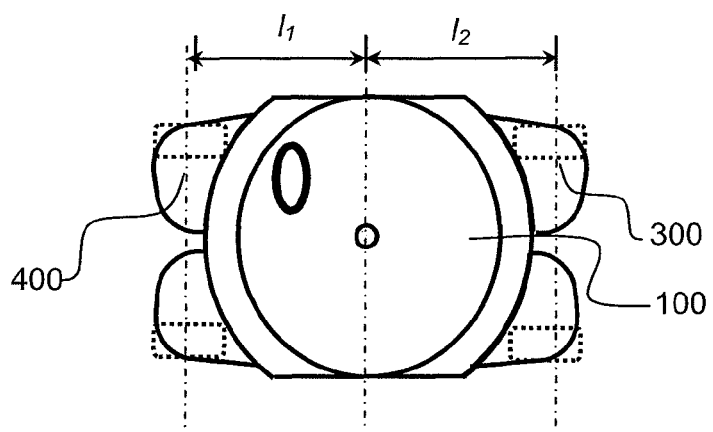
FIG. 4C shows a third variations of the track width and wheelbase for the variable wheel positioning vehicle in accordance with the first embodiment.

FIGS. 4A, 4B and 4C illustrate the wheel geometries that result when the wheels 390 are moved to obtain different wheelbases. As shown in FIG. 4, the track width and wheelbase changing actuators (wheel position changing device) 350 shown in FIGS. 2, 3A and 3B are used to move the wheels 390. Thus, the track width and wheelbase changing actuators 350 changes the wheel base of the vehicle with variable wheel geometry that can be reduced to a minimum of $l_a \times 2$ or increased to a maximum of $l_c \times 2$.

Therefore, when the vehicle with variable wheel geometry in accordance with the first embodiment is, for example, traveling at a comparatively low speed on a city street or being parked in a garage at a very low speed, a smaller turning radius can be obtained by reducing the wheelbase. Meanwhile, when the vehicle is traveling at a high speed or a medium speed or traveling on a winding road, traveling stability can be obtained by increasing the wheelbase. These wheel position movement operations can be selected automatically based on the vehicle speed or other parameter or by using operations performed by the driver.

A wheel position movement control executed in the first embodiment based on the wheel loads will now be explained. This control is used mainly when the vehicle is traveling normally under conditions other than the city street travel and garage parking mentioned above. More specifically, this control is used when the vehicle requires traveling stability and is contrived to improve the traveling stability by moving the wheels based on the wheel loads instead of simply changing the track width and wheelbase.

Figure 5:
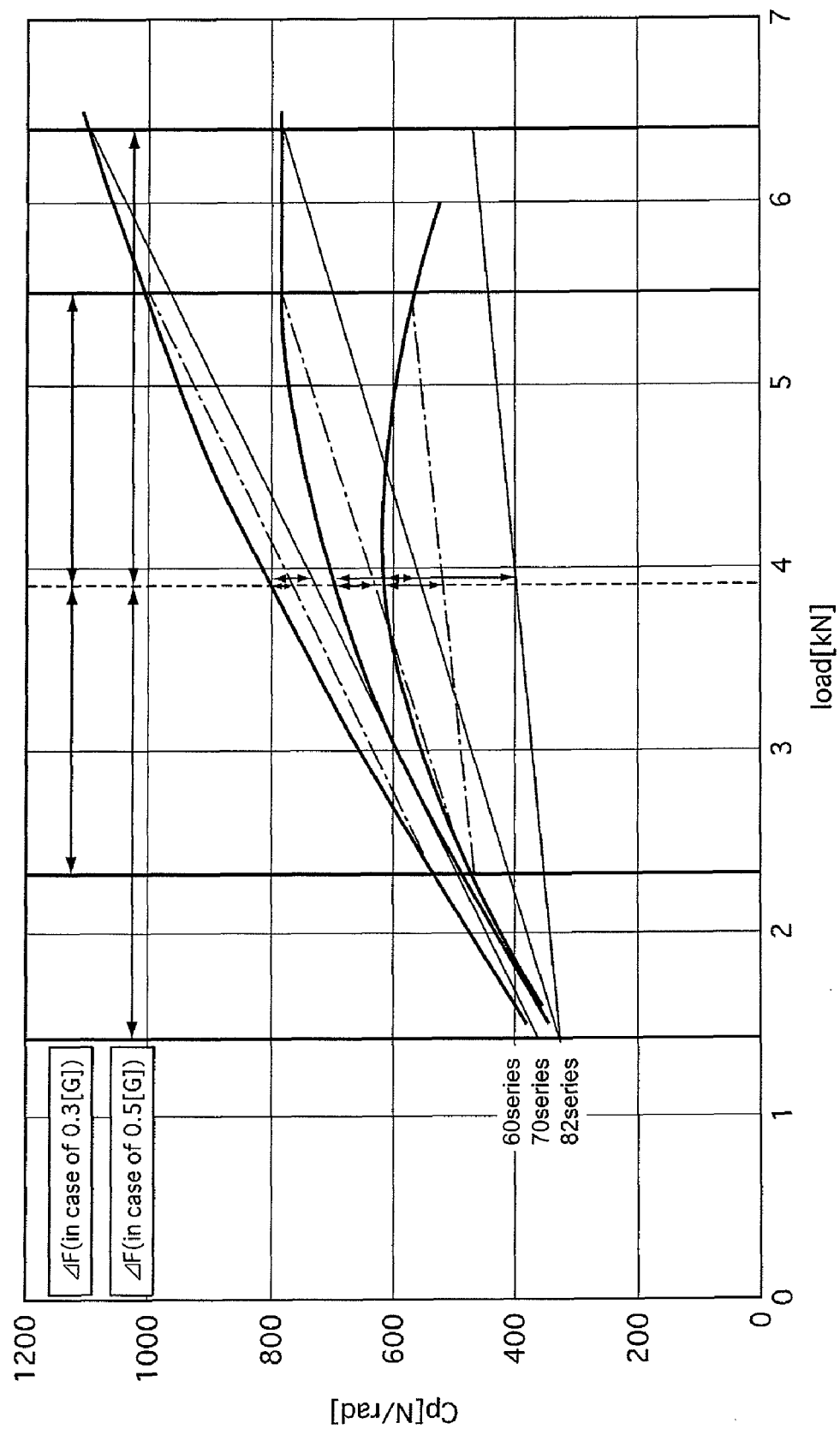
FIG. 5 is a plot of cornering power versus wheel load during turning.

The effect of shifting the wheel loads on the traveling behavior of the vehicle will now be explained with reference to FIG. 5. The curves of FIG. 5 plot the cornering power Cp versus the wheel load during a turn. The solid-line curves show the cornering power Cp of a wheel of different vehicles of prescribed specifications obtained when the wheel loads are shifted during a turn. Since the cornering power is highly dependent on the tire aspect ratio, FIG. 5 shows plots for a tire aspect ratio of 60 (60 series), a tire aspect ratio of 70 (70 series), and a tire aspect ratio of 82 (82 series). In general, the cornering power Cp is larger when the tire aspect ratio is smaller and smaller when the tire aspect ratio is larger. Conversely, the fuel efficiency improves when the aspect ratio is larger.

According to the cornering power Cp versus wheel load curve for a tire aspect ratio of 70 in FIG. 5, the wheel load of each wheel is 3.9 kN when there the vehicle is not undergoing a turning acceleration. When the turning acceleration is, for example, 0.3 G, the wheel load of a wheel on the outside of the turn increases to 5.5 kN and the wheel load of a wheel on the inside of the turn decreases to 2.3 kN due to load shifting. When this occurs, the cornering power of the wheels on the outside of the turn increases due to the increase in wheel load and the cornering power of the wheels on the inside of the turn decreases due to the decrease in wheel load. Furthermore, since the lateral tire forces of the wheels on the outside of the turn change non-linearly, the cornering power of the wheels on the outside of the turn tends to increase non-linearly as the wheel load increases. Also there is a region where increases in the wheel load do not necessary coincide with an increase in the cornering power.

Consequently, when a vehicle with tires having a tire aspect ratio of 70 undergoes a turning acceleration of 0.3 G, the decrease in the cornering power of wheels on the inside of the turn is larger than the increase in the cornering power of the wheels on the outside of the turn and, thus, the total cornering power decreases. This phenomenon is indicated in FIG. 5 by joining the cornering power of an inside wheel and the cornering power of an outside wheel in the case of a 0.3-G turn with a straight line (indicated as a single-dot chain line) and comparing to the coming power before the turn started (i.e., when the wheel loads had not yet shifted and all were 3.9 kN). In this way, it can be confirmed that the total cornering power decreases on average, as indicated with the arrows. Similarly, the average cornering power of tires having an aspect ratio of 70 undergoing a 0.5-G turn is indicated with a fine line in FIG. 5. In this case, the decrease in the total cornering power is even more marked (larger). The reason for the larger decrease is that the outside wheel has reached a limit value of the cornering power and entered a region in which the cornering power does not increase as the wheel load increases. Similar graphs are provided for tires having an aspect ratio of 82 and 60, respectively, and similar decreases in the cornering power occur in both cases due to shifting of the wheel loads. The decrease is particularly large in the case of tires having an aspect ratio of 82, but even tires with an aspect ratio of 60 exhibit a substantial decrease in cornering power.

If the wheel loads did not shift during turning, then the cornering power would not decrease and the vehicle behavior could be stabilized without incurring a decline in turning performance. Even when it is not necessary to increase the maximum value of the cornering power, a balanced wheel load distribution would be advantageous because it would enable a tire with a higher aspect ratio to be selected and, thus, enable the fuel efficiency to be improved. In other words, if the wheel loads can be distributed uniformly during turning such that the wheel loads do not shift and all of the tires are used uniformly, then a decrease in cornering power can be avoided and the vehicle behavior can be stabilized.

While FIG. 5 shows the effect of wheel load shifting on cornering power, a similar trend exists when cornering power is replaced with deceleration G or acceleration G. In other words, when the wheel loads have shifted due to acceleration or deceleration, the tire friction force on the side where the wheel load has increased reaches a limit and the braking force or acceleration force is restricted. Meanwhile, on the side where the wheel loads have decreased, the tires have ample potential to increase the tire friction force but a large tire friction force cannot be imparted to the road because the wheel load is small. Therefore, the vehicle behavior during deceleration and acceleration can be stabilized by distributing the wheel loads uniformly.

Figure 6:
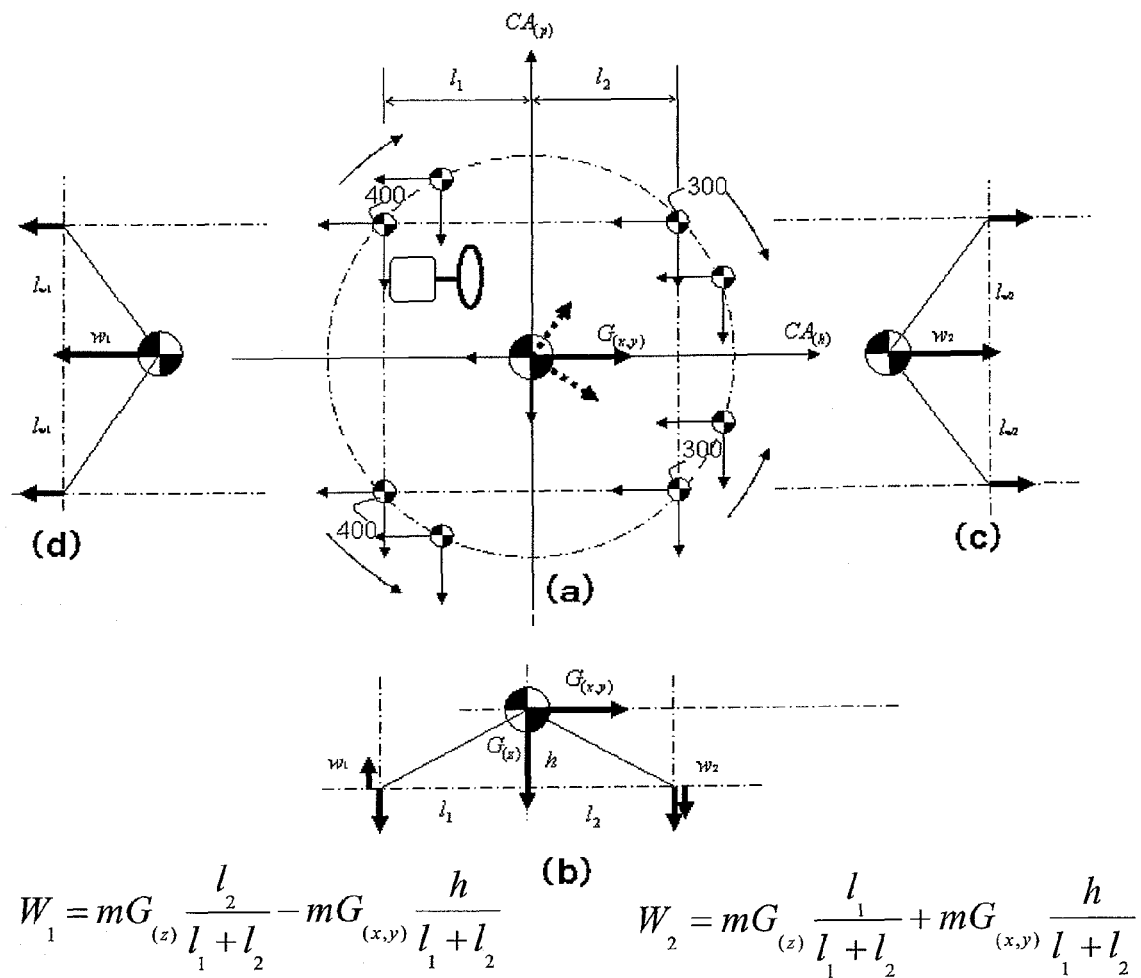
FIG. 6 shows the track width and wheelbase positions of a vehicle with variable wheel geometry in accordance with the first embodiment when the wheel loads of the four wheels are distributed equally.

FIG. 6 illustrates a case in which the wheel positions, i.e., the track width and wheel base, are controlled such that the wheel loads of the four wheels are uniformly distributed. In the first embodiment, the positions of the wheels are changed so as to make the wheel loads of the four wheels equal. Diagram (a) of FIG. 6 shows the positions of the wheels and the center of gravity of the vehicle when the vehicle is viewed from above, and diagram (b) of FIG. 6 shows the positions of the wheels and the center of gravity when the vehicle is viewed from the side along a direction perpendicular to the acceleration direction. In diagram (a) of FIG. 6, the resultant acceleration of the vehicle center of gravity G resulting from turning, acceleration, deceleration, or a combination thereof (i.e., the yaw rate and centrifugal force in the case of turning, the longitudinal acceleration in the case of acceleration or deceleration, and both in the case of acceleration or deceleration while turning) is indicated as the resultant acceleration $G_{(x, y)}$. The direction of the resultant acceleration G(x, y) is set as a resultant acceleration direction axis $CA_{(h)}$. An axis perpendicular to the plane of the view shown in diagram (a) of FIG. 6 and passing through the vehicle center of gravity G is set as the resultant acceleration direction perpendicular axis $CA_{(p)}$.

The resultant acceleration vector $G_{(x, y)}$ is determined with the acceleration and yaw rate sensor 120 mounted to the vehicle body. The X direction and Y direction are determined based on the position and direction in which the sensor is mounted to the vehicle body. Typically, the X direction corresponds to the longitudinal direction of the vehicle body and the Y direction corresponds to the lateral (transverse) direction of the vehicle body.

An axis corresponding to translating the resultant acceleration direction perpendicular axis $CA_{(p)}$, a distance $l_2$ in the direction of the resultant acceleration vector $G_{(x, y)}$, is set as an acceleration rearward axis. Also an axis corresponding to translating the resultant acceleration direction perpendicular axis $CA_{(p)}$, a distance $l_1$ in the opposite direction of the resultant acceleration vector $G_{(x, y)}$ is set as an acceleration frontward axis. The acceleration rearward axis and the acceleration frontward axis serve as imaginary wheel axles.

If the acceleration of the vehicle center of gravity G in the vertical direction (mainly acceleration due to gravity) is indicated with a vector $G_{(z)}$ and the height of the center of gravity from the road surface is indicated as h, then the wheel load $W_2$ acting on the acceleration rearward axis and the wheel load $W_1$ acting on the acceleration frontward axis can be expressed with the equation set (1) shown below.

$$W_1 = mG_{(z)} \frac{l_2}{l_1 + l_2} - mG_{(x,y)} \frac{h}{l_1 + l_2}$$

$$W_2 = mG_{(z)} \frac{l_1}{l_1 + l_2} + mG_{(x,y)} \frac{h}{l_1 + l_2}$$

$$G_{(x,y)} = \{(G_{(x)} + \Delta G_{(x)}2) + (G_{(y)} + \Delta G_{(y)}2)\}1/2:$$

Equation Set (1)

resultant acceleration where
  $G_{(i)}$: detected by acceleration and yaw rate sensor
  $\Delta G_{(i)}$: attitude revision acceleration calculated based on target vehicle attitude
  m: vehicle mass
  h: center of gravity height $G_{(z)}$: acceleration due to gravity In order to suppress the wheel load movement and stabilize the vehicle behavior, the wheel load $W_2$ at the acceleration rearward axis should be made equal to the wheel load $W_1$ at the acceleration frontward axis i.e., the values $W_1$ and $W_2$ determined by the equation set (1) should be made approximately equal. As is clear from the equation set (1), when the values $l_1$ and $l_2$ approach infinity, the values $W_1$ and $W_2$ become approximately equal regardless of the size of $G_{(x, y)}$. The reason is that the wider the spacing between the wheels is, the smaller the amount by which the wheel loads shift due to the resultant acceleration and the more stable the vehicle behavior becomes. This phenomenon corresponds to the well-known concept of a wide track width and a long wheel base.

In previously proposed vehicles with variable wheel geometry, in order to achieve both a compact vehicle size and a stable vehicle performance, the track width is widened and the wheelbase is lengthened to stabilize the vehicle when the vehicle is traveling at high speeds (high speed travel and/or winding) under conditions where large accelerations can occur. Meanwhile, when the vehicle is traveling at low speeds (e.g., urban streets) under conditions where large accelerations do not occur, the wheel positions are changed to achieve a narrow track width and a short wheelbase to make the vehicle more compact and improve the turning performance. However, in view of the direction of the resultant acceleration, the shifting of the wheel loads can be suppressed without necessarily using a wide track width and a long wheelbase.

In other words, the wheel loads of the four wheels can be made equal by satisfying the relationship $W_1=W_2$, i.e., by adjusting the values of $l_1$ and $l_2$ such that the equations shown below are satisfied.

$$\frac{m}{l_1+l_2}(l_2 G_{(z)} - hG_{(x,y)}) = \frac{m}{l_1+l_2}(l_1 G_{(z)} - hG_{(x,y)})$$

$$l_2 G_{(z)} - hG_{(x,y)} = l_1 G_{(z)} + hG_{(x,y)}$$

$$(l_2 - l_1)G_{(z)} = 2hG_{(x,y)}$$

$$1 - l_{rate} = 2h_{rate} G_{rate}$$

$$l_{rate} = 1 - 2h_{rate} G_{rate}$$

Equation Set 2 where $G_{rate} = G_{(x, y)}/GZ$: acceleration ratio
$I_{rate} = l_1/l_2$: geometry ratio
$h_{rate} = h/l_2$: height ratio With the equations above, the positions of the two imaginary wheel axles corresponding to a uniform distribution of the wheel loads of the four wheels are determined for a case in which a resultant acceleration $G_{(x, y)}$ occurs in a certain direction. The wheel loads of the four wheels are then distributed uniformly by arranging the four wheels such that the wheels rotate about axes coincident with the imaginary wheel axles.

The wheel loads of the left and right wheels of each imaginary wheel axle depend on $W_1$ and $W_2$, as shown in diagrams (d) and (c) FIG. 6. When the wheel movement path is a perfect circle as it is in this embodiment, merely arranging the wheels on the axis corresponding to the imaginary wheel axle causes both wheels to be equidistant from the center of gravity of the vehicle. Consequently, the calculation of the wheel load distribution of the left and right wheels with respect to the imaginary wheel axle can be omitted.

Figure 7:
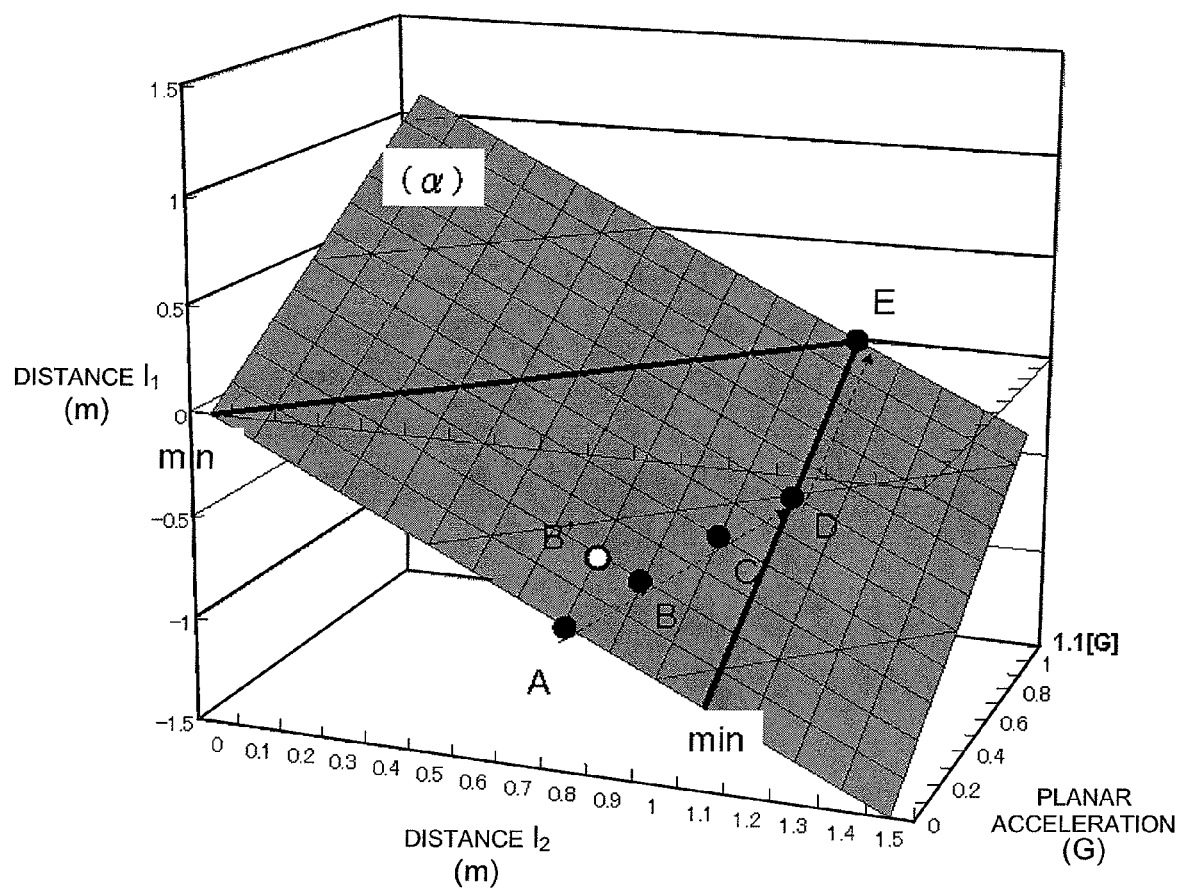
FIG. 7 is a graph expressing a movement range of the distances $l_1$ and $l_2$ for the variable wheel positioning vehicle in accordance with the first embodiment when it is assumed that the height of the center of gravity is 0.5 m.

FIG. 7 shows the range within which $l_1$ and $l_2$ can be moved in order to distribute the wheel axel loads $W_1$ and $W_2$ uniformly. FIG. 7 is obtained by calculating the movable range of $l_1$ and $l_2$ based on an assumption that the center of gravity height h is 0.5 m. FIG. 7 is a plot of the combinations of $l_1$ and $l_2$ that result in uniform wheel axle loads versus the planar acceleration (G) and takes the form of a uniform wheel load plane α.

Using FIG. 7, the movement range of $l_1$ and $l_2$ in which the wheel loads of the four wheels can be distributed equally while minimizing the distance between axles is found for values of the acceleration Grate of the vehicle up to 1.1 G (assuming the friction coefficient is approximately 1.0 and there are no special downward forces), which is the maximum value typically achieved by a vehicle.

As indicated with the lines min in FIG. 7, the wheel loads can be distributed uniformly under maximum acceleration conditions by setting $l_1=0$ and $l_2=1.1$ m, which corresponds to the point E. Thus, the lines min indicate the range of minimum movement with which a uniform wheel load distribution can be obtained. In other words, the wheel loads can be distributed uniformly for accelerations Grate up to 1.1 G in either direction so long as the vehicle is configured such that it can vary both $l_1$ and $l_2$ from 0 to 1.1 m.

The control of the wheel load distribution in a vehicle capable of varying $l_1$ from 0 to 1.1 m and varying $l_2$ from 0 to 1.1 m will now be explained further with reference to FIG. 7. Assume, for example, that the initial positions of the wheels are such that $l_1$ is 0.8 m and $l_2$ is 0.8 m. This corresponds to point A in FIG. 7. If the vehicle is traveling without accelerating, decelerating, or turning, then the acceleration is 0 G and, thus, the point corresponding to the wheel geometry is uniform wheel load plane α.

Now, consider a case in which a turning acceleration of 0.2 G has occurred and the wheel positions have been moved to a point B. Since a uniform wheel load distribution cannot be achieved unless a point lying on the uniform wheel load plane α is achieved, the control searches for values $l_1$ and $l_2$ that achieve a uniform wheel load distribution at an acceleration of 0.2 G.

In the first embodiment of the present invention, the control searches for wheel positions, i.e., values of $l_1$ and $l_2$, that result in all of the wheels being moved by equal amounts. More specifically, the changes in the wheel positions are given by $\Delta l_1=-0.1$ and $\Delta l_2=+0.1$ when the wheel geometry is moved from point A to point B and $\Delta l_1=-0.2$ and $\Delta l_2=0$ when the wheel geometry is moved from point A to point B'. In the case of point B', the total movement amount is achieved with two actuators and in the case of point B, the total movement amount is achieved with four actuators. Assuming the speeds of all of the actuators are the same, the wheel geometry can be moved to point B more quickly because the amount of movement is distributed among four actuators. Similarly, the wheel geometry is moved to point D as the acceleration increases. If the acceleration increases beyond point D, then the wheel geometry is moved toward point E. When the wheel geometry is moved from point D toward point E, only the value of $l_1$ is changed and a uniform distribution of actuator movement cannot be maintained. However, this movement is set in view of the frequency with which accelerations exceeding 0.6 G occur.

Effects of the first embodiment will now be explained. A vehicle with variable wheel geometry in accordance with the first embodiment achieves the effects listed below.

(1) In the first embodiment, the vehicle is equipped with the steering actuators 340 that are provided on each of the wheels 390 and configured to change the directions of the wheels 390 with respect to the vehicle body 100. Also the track width and wheelbase changing actuators 350 are arranged between each of the wheels 390 and the vehicle body 100 and serve to move the wheels to any desired position along a prescribed path (wheel unit movement path 200). The controller 500 is configured to determine a target wheel geometry in accordance with the traveling state of the vehicle and send wheel position change commands based on the target wheel geometry to the track width and wheelbase actuators 350. As a result, a vehicle that is compact and has a high traveling stability can be achieved with a simple structure while curbing energy consumption.

(2) The controller 500 changes the wheel positions such that the wheel loads of all the wheels are equal. As a result, the vehicle behavior can be improved during turning.

(3) The vehicle is provided with the acceleration and yaw rate sensor 120 to detect the acceleration vector of the vehicle in a horizontal plane and the controller 500 changes the wheel positions using the direction of the detected acceleration vector as a reference. As a result, the control is based on a single direction and, thus, the control can be simplified.

(4) The controller 500 is configured to divide the wheels 390 into two pairs, each on opposite sides of an axis perpendicular to the acceleration vector, and to change the positions of the wheels 390 based on the distances between the wheels 390 of each pair and the perpendicular axis. As a result, since the wheel loads of the left and right wheels of each pair are balanced (i.e., equal to each other), the control can be simplified because it only needs to set a wheel base that achieves equal wheel loads (i.e., set the distance $l_2$ from the center of gravity to the acceleration frontward axis and the distance $l_1$ in the opposite direction from the center of gravity to the acceleration rearward axis).

(5) Since each wheel 390 is moved along the wheel unit movement path 200 that is a single annular path, the track width and wheelbase can be changed while maintaining a prescribed relationship there-between.

(6) Since the annular movement path is nearly a perfect circle, the two wheels arranged on each imaginary wheel axle can be arranged equidistant from the resultant acceleration $G_{(x, y)}$ and the wheel loads of the two wheels arranged on each wheel axle are distributed equally. As a result, the control can be simplified.

Second Embodiment

A second embodiment will now be explained in which the wheel positions are changed based on a target wheel load distribution corresponding to the traveling state of the vehicle. While in the first embodiment the wheel loads are distributed equally, in this embodiment, the wheel loads are distributed unequally depending on the situation. Other than the wheel load distribution control (described above), the constituent features of the second embodiment are the same as those of the first embodiment and explanations and drawings thereof are omitted for the sake of brevity.

Figure 8:
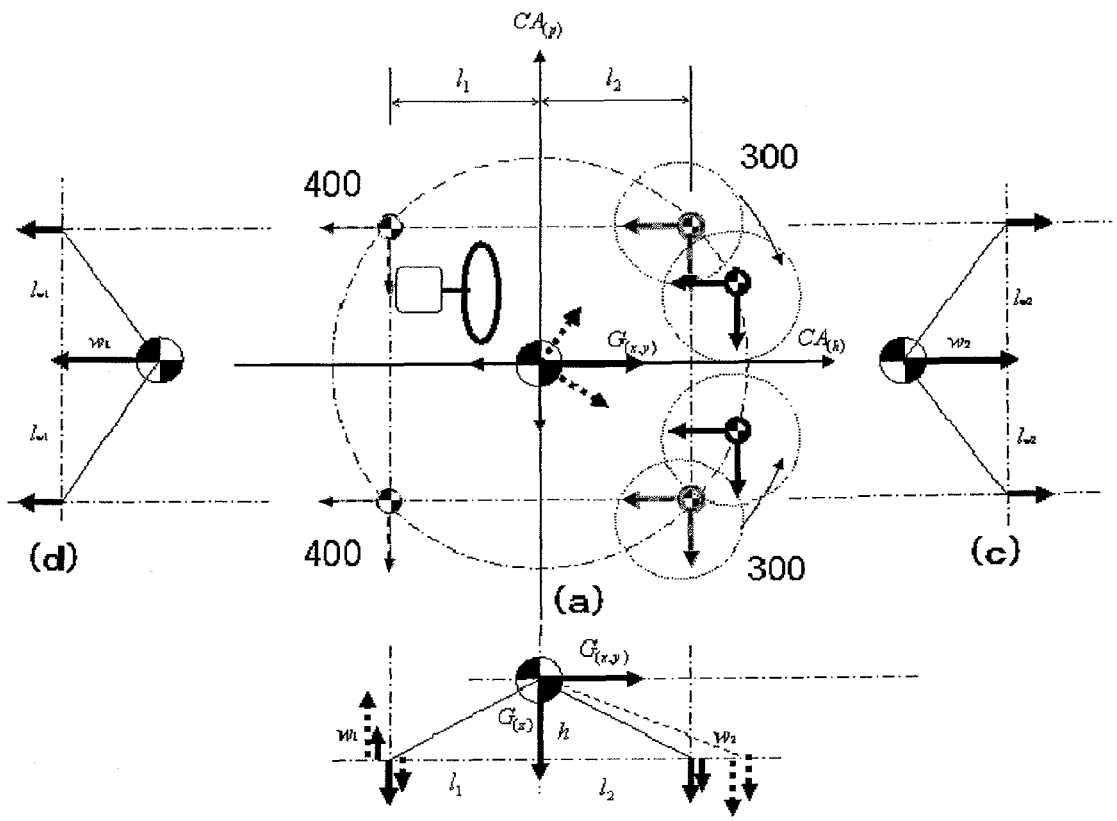
FIG. 8 shows the track width and wheelbase positions of the variable wheel positioning vehicle in accordance with a second embodiment when the wheel loads of the four wheels are distributed freely.

FIG. 8 illustrates a case in which the track width and wheelbase are controlled such that the wheel loads of the four wheels are distributed freely. More specifically, the wheel load distribution, i.e., the wheel geometry, is controlled such that the wheel loads of the drive wheels are increased.

In the first embodiment, the wheel loads are distributed equally so as to use the tires of all four wheels equally. The vehicle behavior can be stabilized by distributing the wheel loads equally when the functions of all wheels are the same, such as during braking and turning. When the functions of the wheels are different, such as drive wheels versus non-drive wheels, the vehicle behavior cannot necessarily be stabilized by distributing the wheel loads equally. For example, during acceleration, a larger drive force can be transferred to the road surface by increasing the wheel loads of the drive wheels. Meanwhile, increasing the wheel loads of the non-drive wheels does not contribute to the transfer of the drive force. Thus, during acceleration, it is preferred to increase the wheel loads of the drive wheels to the extent that doing so does not diminish the friction limit of the tires or the rectilinearity of the vehicle. Particularly in the case of a rear-wheel drive vehicle, the wheel loads of the drive wheels (rear wheels) tend to increase during acceleration due to a rearward shifting of the vehicle body relative to the wheels. Thus, if a wheel load distribution control is executed to distribute the wheel loads equally during acceleration, the control will act to return the wheel loads that naturally shifted to the rear wheels back to the front wheels. Consequently, there is a possibility that the wheel loads of the rear wheels will not increase and the acceleration performance will be degraded by the wheel load distribution control.

In the second embodiment, similarly to the first embodiment, the acceleration of the center of gravity is expressed as a resultant acceleration vector $G_{(x, y)}$ of acceleration in two arbitrary directions in the plane of motion. Based on the resultant acceleration vector $G_{(x, y)}$, the control sets the distance $l_2$ from the center of gravity (i.e., from the vector axis of a vector $G_{(z)}$ that is perpendicular to $G_{(x, y)}$) to an acceleration frontward axis along the direction of the resultant acceleration vector $G_{(x, y)}$ and the distance $l_1$ from the center of gravity to an acceleration rearward axis along the opposite direction of the resultant acceleration vector $G_{(x, y)}$. The equation set (2) used in the first embodiment is modified to equation set (3) as shown below for use in the second embodiment.

$$\frac{m}{l_1 + l_2}(l_2 G_{(z)} - h G_{(x,y)}) = \frac{m}{l_1 + l_2} W_{rate}(l_1 G_{(z)} - h G_{(x,y)}) \quad \text{Equation Set (3)}$$

$$l_2 G_{(z)} - h G_{(x,y)} = l_1 G_{(z)} + h G_{(x,y)}$$

$$(l_2 - l_1 W_{rate}) G_{(z)} = h(l_1 + W_{rate}) G_{(x,y)}$$

$W_{rate} = W_1/W_2$: wheel load ratio

With the equations above, the positions of the two imaginary wheel axles corresponding to a uniform distribution of the wheel loads of the four wheels are determined for a case in which a resultant acceleration $G_{(x, y)}$ occurs in a certain direction. The wheel load ratio of the imaginary wheel axles are then set to $W_{rate}$ by arranging the four wheels such that the wheels rotate about axes coincident with the imaginary wheel axles. In other words, the controller 500 sets the ratio $W_{rate}$ to any value from 0 to 1 when the drive wheels 300 are accelerating and the direction of the acceleration lies along the longitudinal direction of the vehicle body.

If the vehicle is turning or braking, then the ratio $W_{rate}$ is set to 1 ($W_{rate} = 1$) and the wheel geometry is controlled so as to obtain an equal wheel load distribution in the same manner as in the first embodiment. The wheel movement control is the same as in the first embodiment (described above) and an explanation thereof is omitted here for the sake of brevity.

Effects of the embodiment will now be explained. The vehicle with variable wheel geometry in accordance with the second embodiment achieves the effects listed below.

(7) The controller 500 can change the wheel positions so as to obtain any desired wheel load ratio in accordance with the traveling state of the vehicle. As a result, in addition to controlling the wheel positions so as to achieve a uniform wheel load distribution, the controller 500 can also, for example, suppress slippage of the drive wheels by setting the wheel load distribution such that the wheel loads of the drive wheels are increased.

Third Embodiment

The third embodiment exemplifies a case in which the wheel positions are changed based on a target vehicle attitude. Other than the wheel load distribution control (described above in the first embodiment and in the second embodiment), the constituent features of the third embodiment are the same as those of the first and second embodiments and explanations and drawings thereof are omitted for the sake of brevity.

Figure 9:
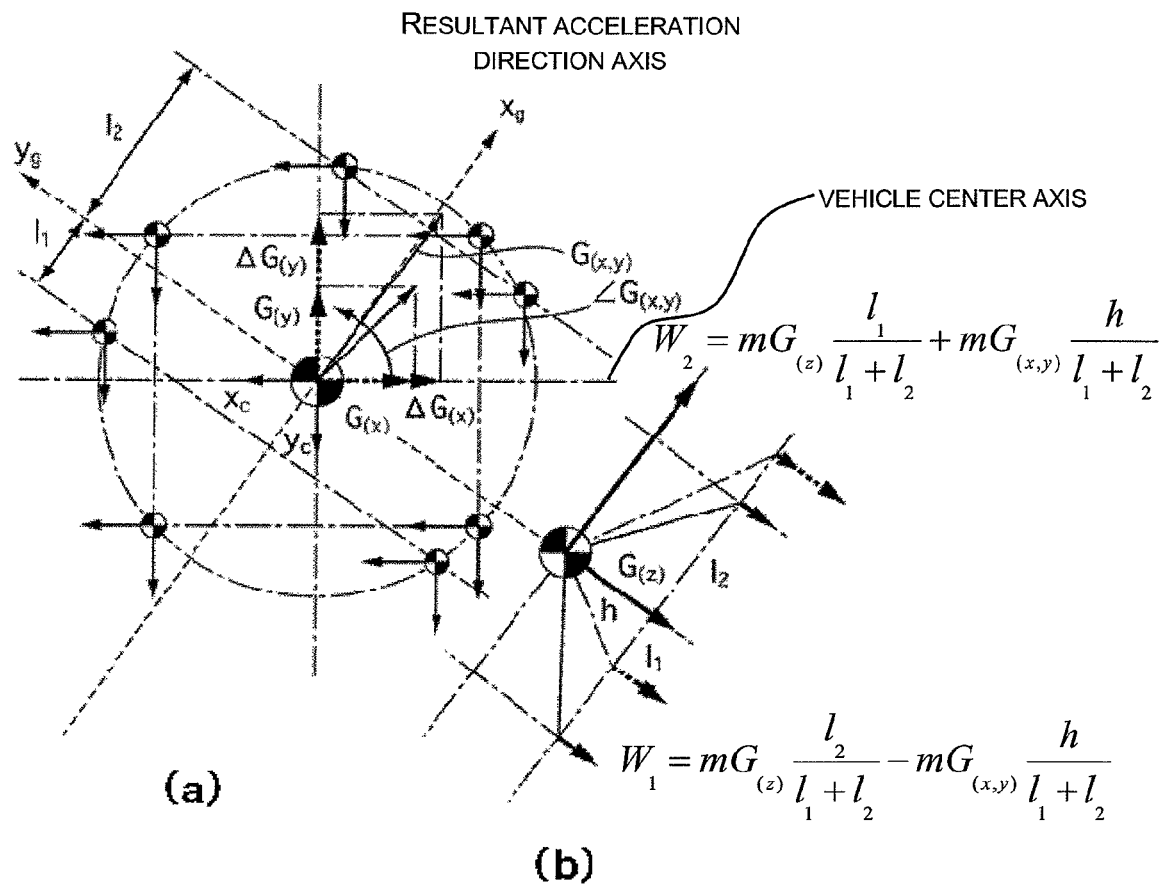
FIG. 9 shows the track width and wheelbase positions of the variable wheel positioning vehicle in accordance with a third embodiment when the wheel positions are controlled so as to achieve a desired vehicle attitude angle.

FIG. 9 illustrates a case in which the track width and wheelbase are controlled such that the wheel loads of the four wheels are distributed freely. In the third embodiment, the wheel loads are changed based on a target vehicle attitude. In the third embodiment, similarly to the first embodiment, the acceleration of the center of gravity is expressed as a resultant acceleration vector $G_{(x, y)}$ of acceleration in two arbitrary directions in the plane of motion. Based on the resultant acceleration vector $G_{(x, y)}$, the control sets the distance $l_2$ from the center of gravity (i.e., from the vector axis of a vector $G_{(z)}$ that is perpendicular to the vector $G_{(x, y)}$) to an acceleration frontward axis along the direction of the resultant acceleration vector $G_{(x, y)}$ and the distance $l_1$ from the center of gravity to an acceleration rearward axis along the opposite direction of the resultant acceleration vector $G_{(x, y)}$.

$$\tan\theta_{xy} = \frac{\frac{W_2}{k} - \frac{W_1}{k}}{l_1 + l_2} \qquad \text{Equation Set (4)}$$

In the equation, tan θ is the attitude angle in the acceleration direction and the term k is a spring coefficient for portion of the vehicle between the wheels and the vehicle body (mainly the suspension).

From the equation above, it is clear that the attitude angle of the vehicle can be controlled if the wheel loads $W_1$ and $W_2$ can be adjusted freely to any desired value when a resultant acceleration $G_{(x, y)}$ exists in a certain direction. If the wheel positions are controlled in the manner of the first embodiment, then the wheel loads will be equally distributed and $W_1$ will equal $W_2$. Consequently, the attitude angle will be 0° and the vehicle will always have a flat attitude. Conversely, if the wheel positions are controlled in the manner of the second embodiment, then the wheel loads can be distributed freely and the desired attitude angle can be obtained.

In the third embodiment, an attitude revision acceleration $\Delta G_{(i)}$ is calculated based on a target vehicle attitude that is based on a roll angle and a pitching angle. The distances $l_1$ and $l_2$ are set such that the attitude revision acceleration $\Delta G_{(i)}$ is satisfied. In this way, the desired vehicle attitude is obtained and the vehicle behavior can be stabilized by suppressing the rolling that occurs when the vehicle is turning or being blown by a cross wind and the pitching (nose diving and squatting) that occurs when the vehicle is traveling on a bumpy road or accelerating or decelerating (braking) rapidly.

Effects of the embodiment will now be explained. The vehicle with variable wheel geometry in accordance with the third embodiment achieves the effects listed below.

(8) Since the controller 500 changes the wheel positions based on a target vehicle attitude that is set in accordance with the traveling state of the vehicle, a target vehicle attitude that is appropriate for the traveling state can be achieved.

(9) Since the controller 500 sets the target vehicle attitude based on the vehicle roll angle, the roll angle can be set freely. As a result, for example, the roll angle can be prevented from increasing during turning or cross winds and the vehicle behavior can be stabilized.

(10) Since the controller 500 sets the target vehicle attitude based on the vehicle pitching angle, the pitching angle can be set freely. As a result, for example, the vehicle can be prevented from squatting during rapid acceleration and nose diving during rapid braking.

Fourth Embodiment

A fourth embodiment will now be explained. The fourth embodiment exemplifies a case in which a base wheel is set in accordance with the acceleration direction and the positions of the wheels other than the base wheel are moved. Other than the wheel movement control (described above), the constituent features of the fourth embodiment are the same as those of the first embodiment and explanations and drawings thereof are omitted for the sake of brevity.

While in the first embodiment the movement of the wheel positions is computed such that all wheels are moved by the same amount (distance), in the fourth embodiment one of the imaginary wheel axles is held fixed relative to the center of gravity of the vehicle and the other imaginary wheel axle is moved. More specifically, if the distance from the center of gravity to the imaginary wheel axle located in the acceleration direction relative to the center of gravity is $l_2$ and the distance from the center of gravity to the imaginary wheel axle located in the opposite direction as the acceleration direction is $l_1$, then only the wheel axis distance $l_1$ is changed.

Figure 10:
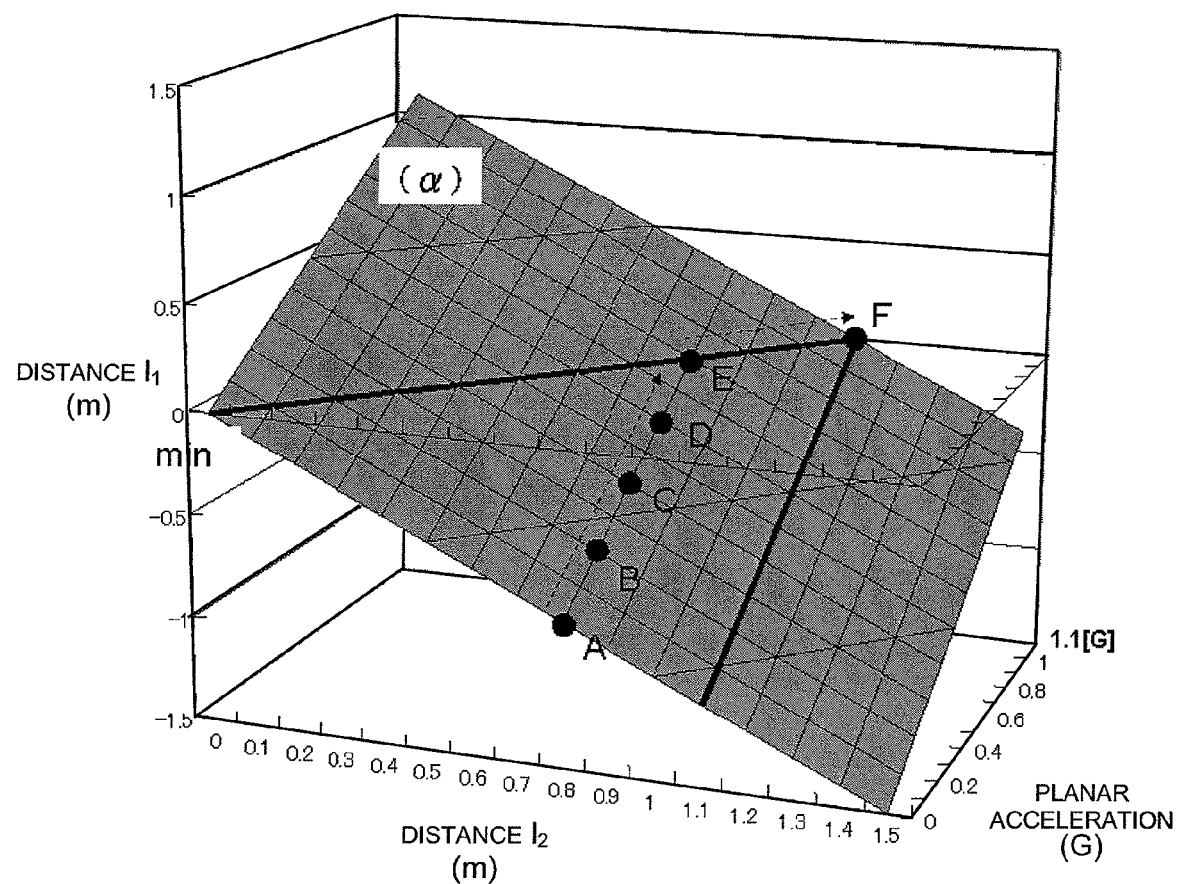
FIG. 10 is a graph expressing a movement range of the distances $l_1$ and $l_2$ in the variable wheel positioning vehicle in accordance with a fourth embodiment when a base wheel or base wheels is/are held fixed and the other wheels are moved so as to obtain any desired wheel load distribution for the four wheels.

Similarly to the first embodiment, FIG. 10 shows a uniform wheel load plane α and the range within which $l_1$ and $l_2$ can be moved in order to distribute the wheel axle loads $W_1$ and $W_2$ equally.

Similarly to the first embodiment, assume, for example, that the initial positions of the wheels are such that $l_1$ is 0.8 m and $l_2$ is 0.8 m, as indicated in FIG. 10 with the initial position point A. When the value of $l_2$ is fixed, the wheel loads can be distributed equally by changing the value of $l_1$ alone (moving from point A to point B) for accelerations up to approximately 0.8 G. Specific driving situations in which this kind of wheel geometry change can presumably be used will now be explained.

Figure 11:
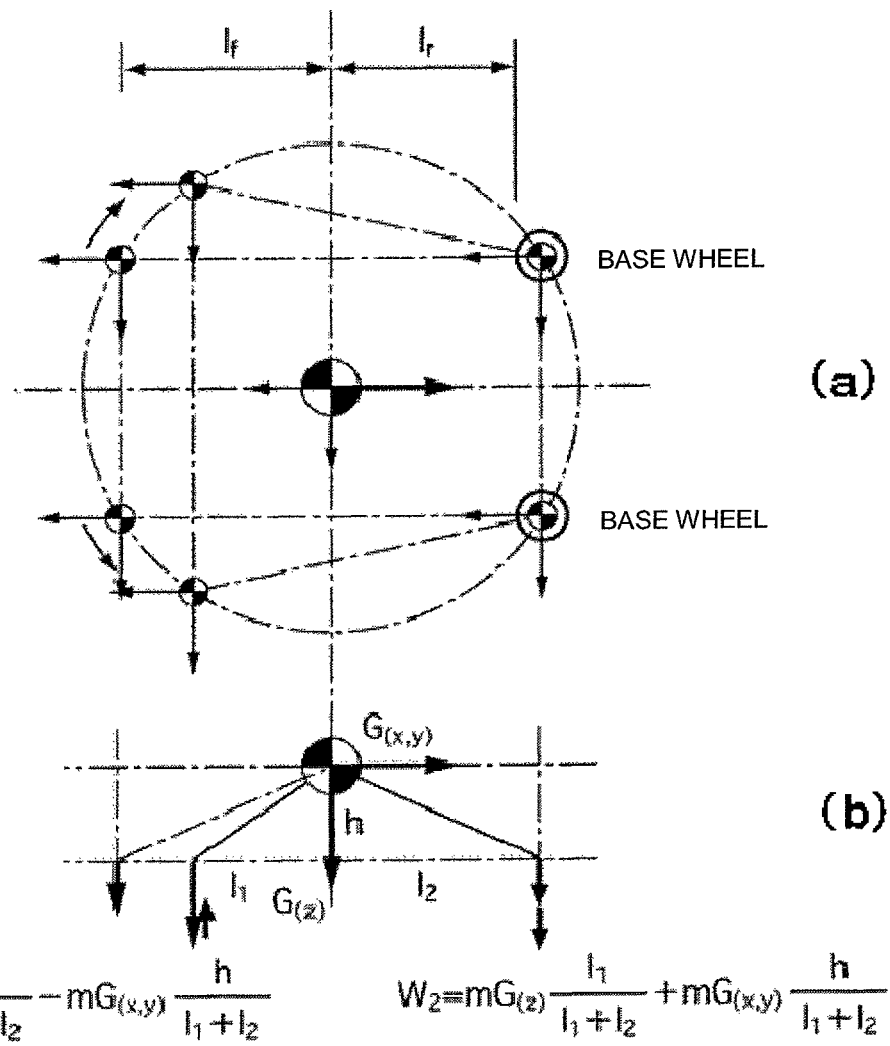
FIG. 11 shows a wheel arrangement used in the fourth embodiment during acceleration.

FIG. 11 shows a wheel arrangement employed during acceleration. In the fourth embodiment, the wheel positions are set such that the wheelbase is longer than the track width when the vehicle is traveling at a constant speed and not accelerating. However, when the vehicle accelerates, the rear wheels are set as base wheels (held fixed) and the front wheels are moved rearward to obtain a prescribed vehicle attitude. In other words, when the vehicle accelerates, the wheel loads of the front wheels decrease and the wheel loads of the rear wheels increase. Thus, by moving the front wheels only, the load imposed on the track width and wheelbase changing actuators 350 can be decreased (because the wheel loads of the front wheels are smaller) and the control response can be increased. Also, by moving the front wheels toward the rear of the vehicle, the change in the wheel loads of all the wheels can be curbed in opposition to the rearward movement of the center of gravity that occurs during acceleration. As a result, the vehicle behavior can be stabilized during acceleration.

Figure 12:
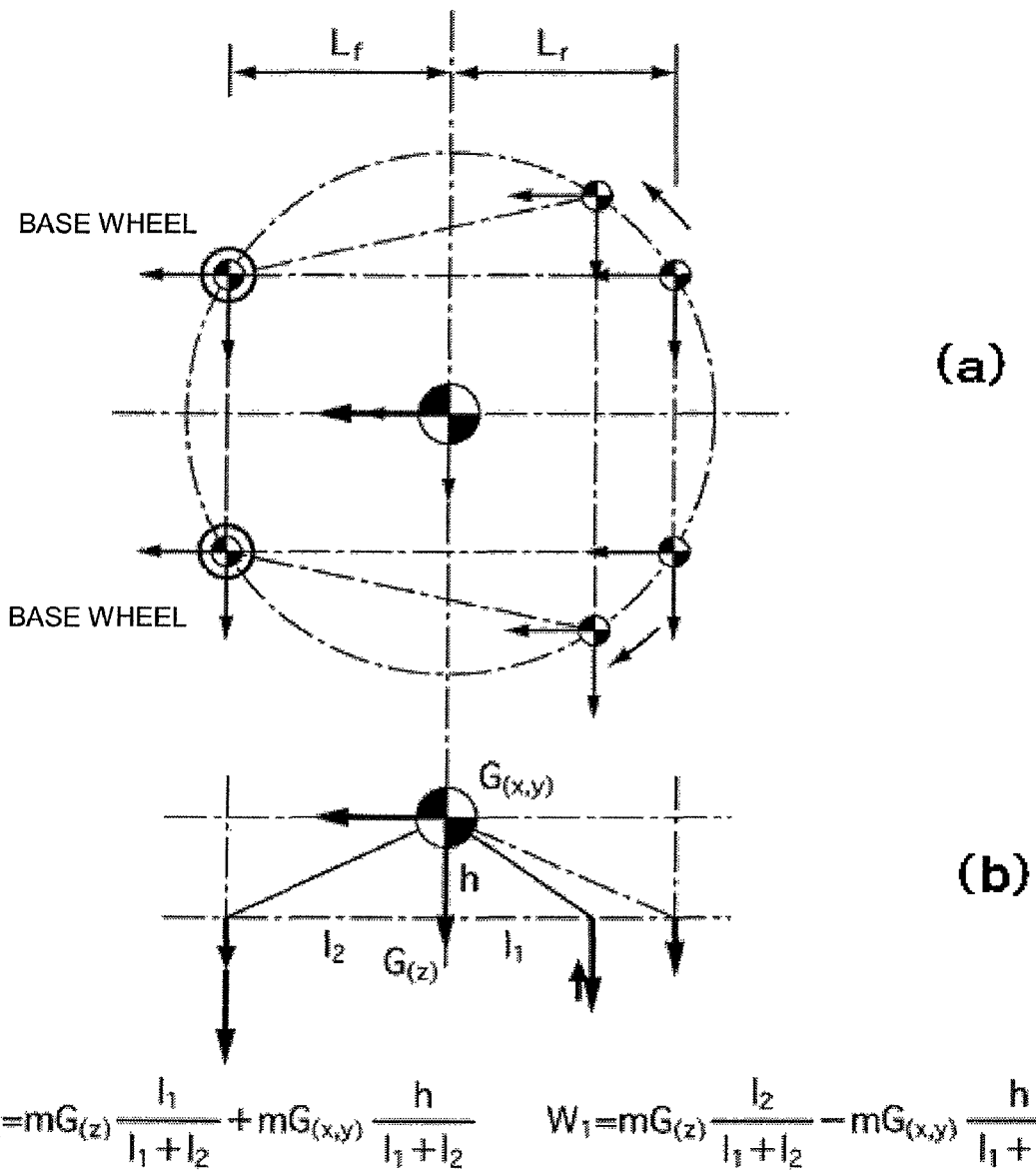
FIG. 12 shows a wheel arrangement used in the fourth embodiment during deceleration.

FIG. 12 shows a wheel arrangement employed during deceleration. When the vehicle decelerates, the front wheels are set as base wheels (held fixed) and the rear wheels are moved frontward to obtain a prescribed vehicle attitude. In other words, when the vehicle decelerates, the wheel loads of the front wheels increase and the wheel loads of the rear wheels decrease. Thus, by moving the rear wheels only, the load imposed on the track width and wheelbase changing actuators 350 can be decreased (because the wheel loads of the rear wheels are smaller) and the control response can be increased. Also, by moving the rear wheels toward the front of the vehicle, the change in the wheel loads of all the wheels can be curbed in opposition to the frontward movement of the center of gravity that occurs during deceleration. As a result, the vehicle behavior can be stabilized during deceleration.

Figure 13:
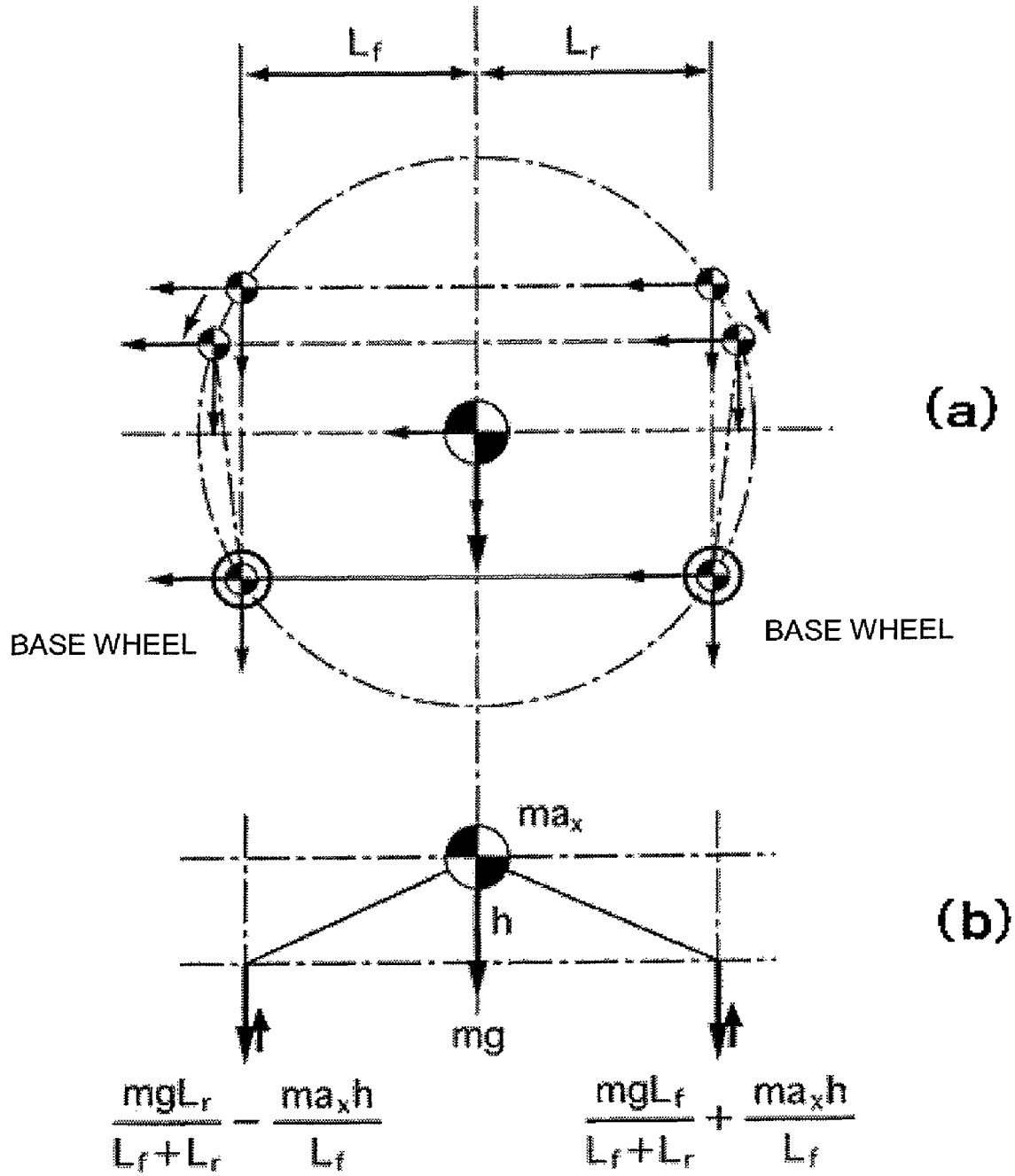
FIG. 13 shows a wheel arrangement used in the fourth embodiment during turning.

FIG. 13 shows a wheel arrangement employed during turning. When the vehicle turns, the wheels on the outside of the turn are set as base wheels (held fixed) and the wheels on the inside of the turn are moved inward toward the longitudinal center axis (middle) of the vehicle to obtain a prescribed vehicle attitude. In other words, when the vehicle turns, the wheel loads of the inside wheels decrease and the wheel loads of the outside wheels increase. Thus, by moving the inside wheels only, the load imposed on the track width and wheelbase changing actuators 350 can be decreased (because the wheel loads of the inside wheels are smaller) and the control response can be increased. Also, by moving the inside wheels toward the longitudinal center axis of the vehicle, the change in the wheel loads of all the wheels can be curbed in opposition to the movement of the center of gravity toward the outside of the curve that occurs during turning. As a result, the vehicle behavior can be stabilized during turning.

Figure 14:
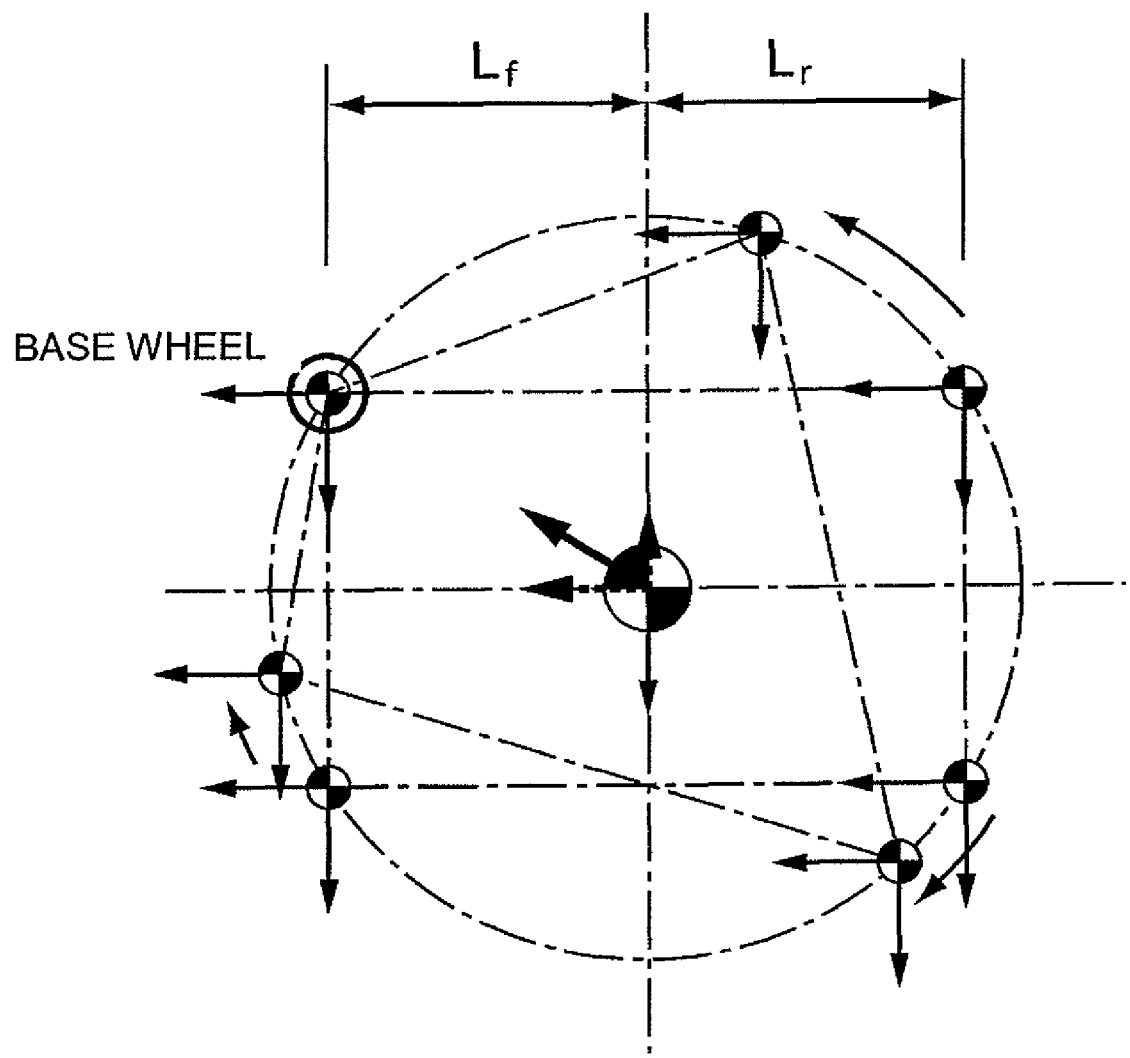
FIG. 14 is a schematic top plan view of a wheel arrangement used in accordance with the fourth embodiment during simultaneous decelerating and turning.

FIG. 14 shows a wheel arrangement employed when the vehicle decelerates and turns at the same time. When the vehicle decelerates and turns, the wheel on the outside of the turn that is closer to the shifted center of gravity is set as a base wheel (held fixed) and the other three wheels are moved inward in appropriate directions so as to suppress changes in the wheel loads and obtain a prescribed vehicle attitude. In other words, when the vehicle decelerates and turns at the same time, the wheel load of the front wheel on the outside of the turn becomes the largest. Thus, by setting the front wheel on the outside of the turn as the base wheel and moving the other three wheels, the load imposed on the track width and wheelbase changing actuators 350 can be decreased (because the wheel load of the other three wheels are smaller) and the control response can be increased.

Figure 15:
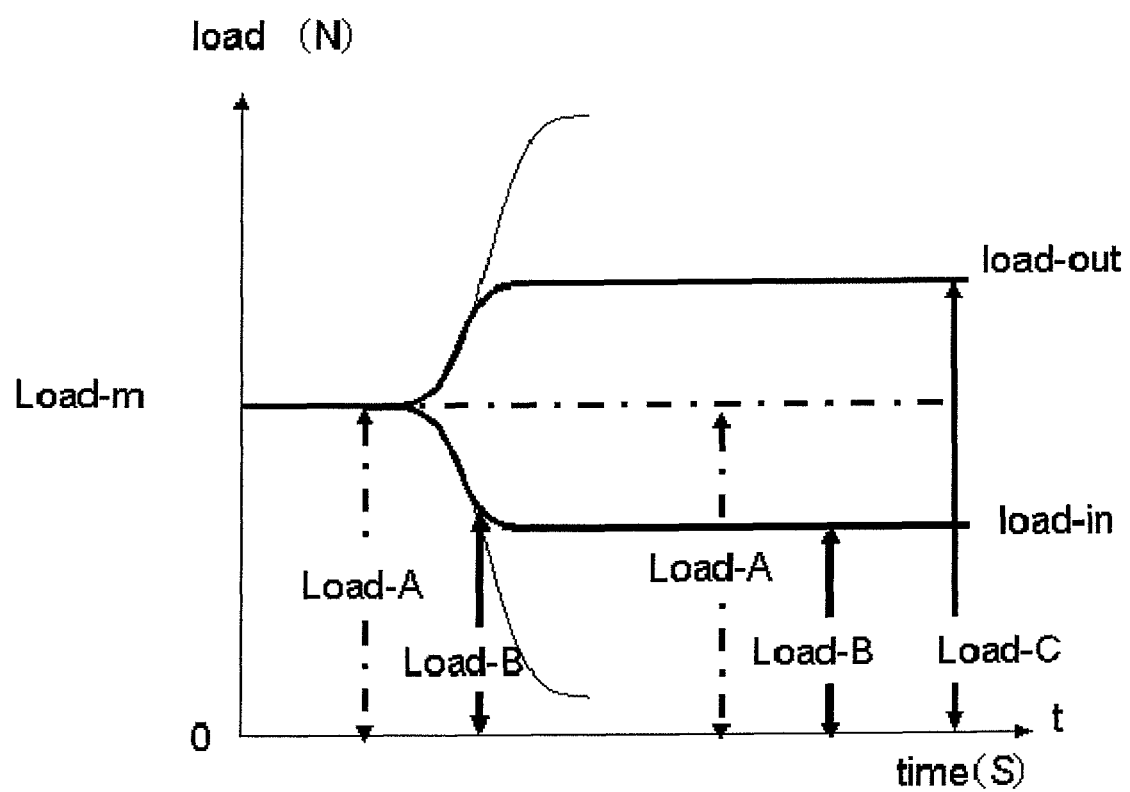
FIG. 15 is a plot showing the actuator loads that occur then wheels other than a base wheel are moved in accordance with the fourth embodiment.

FIG. 15 shows the manner in which the load of an actuator is decreased. FIG. 15 illustrates a case in which the turn is started and the turning G-force develops gradually. The bold-line curve illustrates the load pattern of this embodiment and the dotted line illustrates the load pattern of the first embodiment. The fine line illustrates the load pattern that results when wheel load control is not executed.

At a time t0, turning acceleration is not yet occurring and the loads acting on the actuators (load-m) correspond to the vehicle weight. After turning begins, if the wheel positions are controlled such that the wheel loads are always equal in the manner of the first embodiment, then the actuators will always require an actuator driving force Load-A corresponding to the load Load-m. However, if, the actuators are driven after the turning G-force has developed and the wheel loads have shifted, then the wheel positions can be moved with the smaller actuator driving force Load-B.

Ultimately, similarly to the first embodiment, this embodiment requires the actuator driving force Load-A to achieve a uniform load distribution. However, the number of situations requiring the wheel loads to be perfectly uniform is small and it is acceptable to have some degree of unevenness so long as the friction limit of the outside wheel is not exceeded. In short, with this embodiment, the required actuator driving force can be reduced in most vehicle driving situations.

As shown in FIG. 15, a larger actuator driving force Load-C is required to move the outside wheel whose wheel load has increased. When the turning G-force can be predicted with a navigation system or the like or an increase in the turning G-force can be predicted based on the driving conditions, the control in accordance with the present invention should be stopped and the inside wheels should be moved quickly using the actuator driving force Load-A to positions achieving equal wheel loads before the inside wheels have been moved to the limit of their movement range, thereafter moving both inside and outside wheels with the actuator driving force Load-A even if the turning G-force increases. In this way, the maximum driving force required from the actuators can be limited to Load-A.

Effects of the embodiment will now be explained. A vehicle with variable wheel geometry in accordance with the fourth embodiment achieves the effects listed below.

(11) Since the controller 500 changes the wheel positions such that the wheel loads of the wheels change to a lesser degree, the vehicle behavior can be stabilized.

(12) When it changes the wheel positions, the controller 500 sets one wheel as a base wheel and changes the positions of the wheels other than the base wheel. As a result, the vehicle stability can be increased and the control can be simplified in comparison with a case in which all of the wheels are moved.

(13) Since the controller 500 sets a wheel or wheels having a larger wheel load as the base wheel or base wheels and changes the positions of the wheels having a smaller load, the control response can be increased and the energy required to move the wheels can be reduced.

(14) Since the controller 500 sets a wheel or wheels that are closer to where the center of gravity shifts as the base wheel or base wheels and changes the positions of the other wheels, the control response can be increased and the energy required to move the wheels can be reduced.

Fifth Embodiment

A fifth embodiment will now be explained. In the fifth embodiment, the wheel movement path is configured such that the wheels can be moved in the vertical direction of the vehicle in addition to horizontally.

Figure 16:
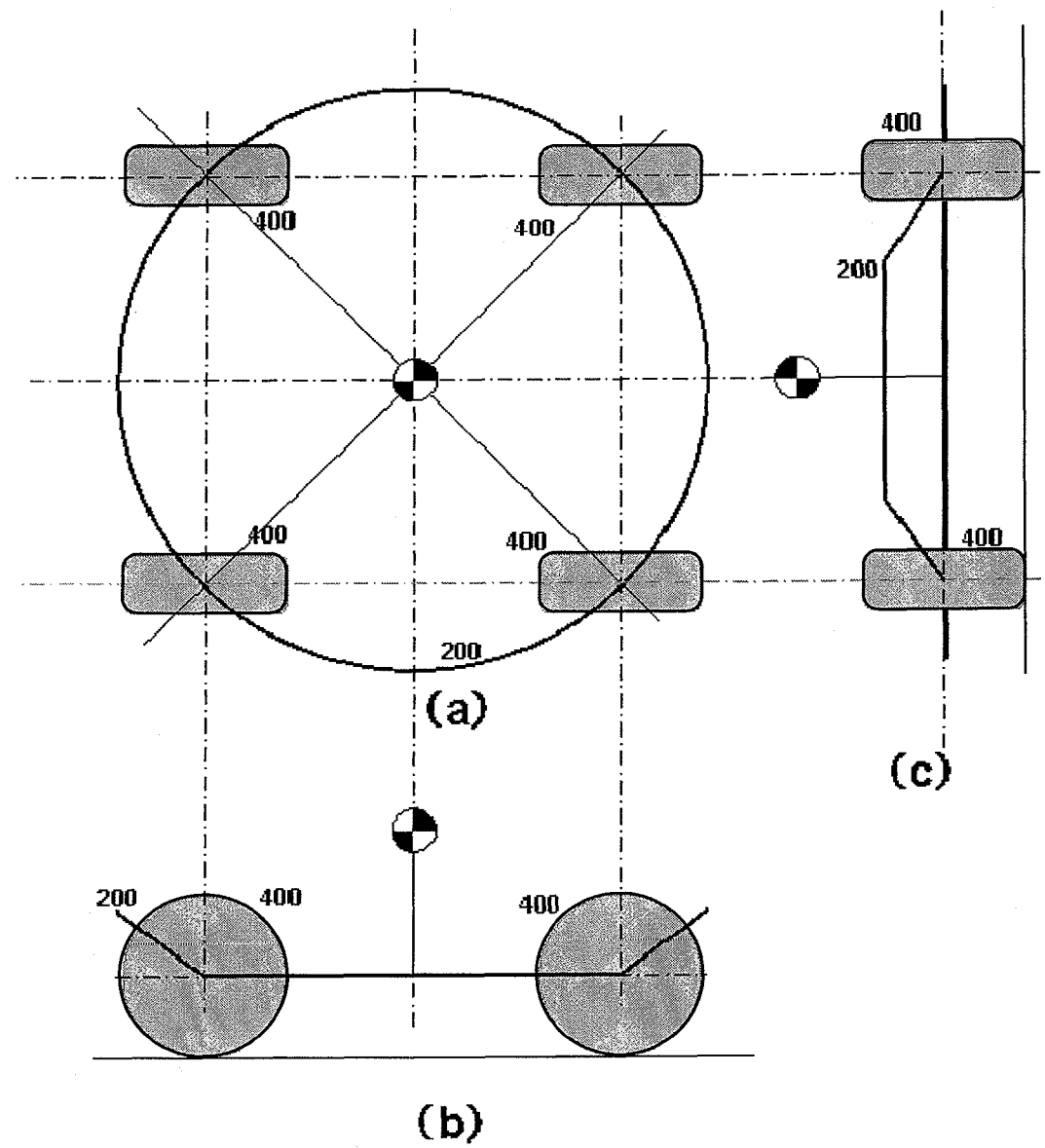
FIG. 16 shows a wheel movement path in accordance with a fifth embodiment.

FIG. 16 shows a vehicle with variable wheel geometry in accordance with the fifth embodiment. In the fifth embodiment, the wheel unit movement path 200 is curved in the vertical direction of the vehicle. Consequently, when the wheel positions are changed horizontally (as seen in a top plan view), the heights of the wheels also change. A rail provided on the vehicle body as described later regarding a sixth embodiment can be utilized as an actual structure for realizing the wheel unit movement path 200 along which the wheel units are moved. In this embodiment, only the shape of the rail will be explained.

As shown in diagram (a) of FIG. 16, when the vehicle is viewed from above (top plan view), the wheel movement path is the same as in the first to fourth embodiments, i.e., a single annular path centered on the center of gravity. Meanwhile, as shown in diagram (b) of FIG. 16, when the vehicle is viewed from the side, both ends of the movement path are tilted upward instead of horizontal. Furthermore, when the vehicle is viewed from the rear (or front) as shown in diagram (c) of FIG. 16, both ends of the movement path are tilted downward instead of horizontal.

Figure 18:
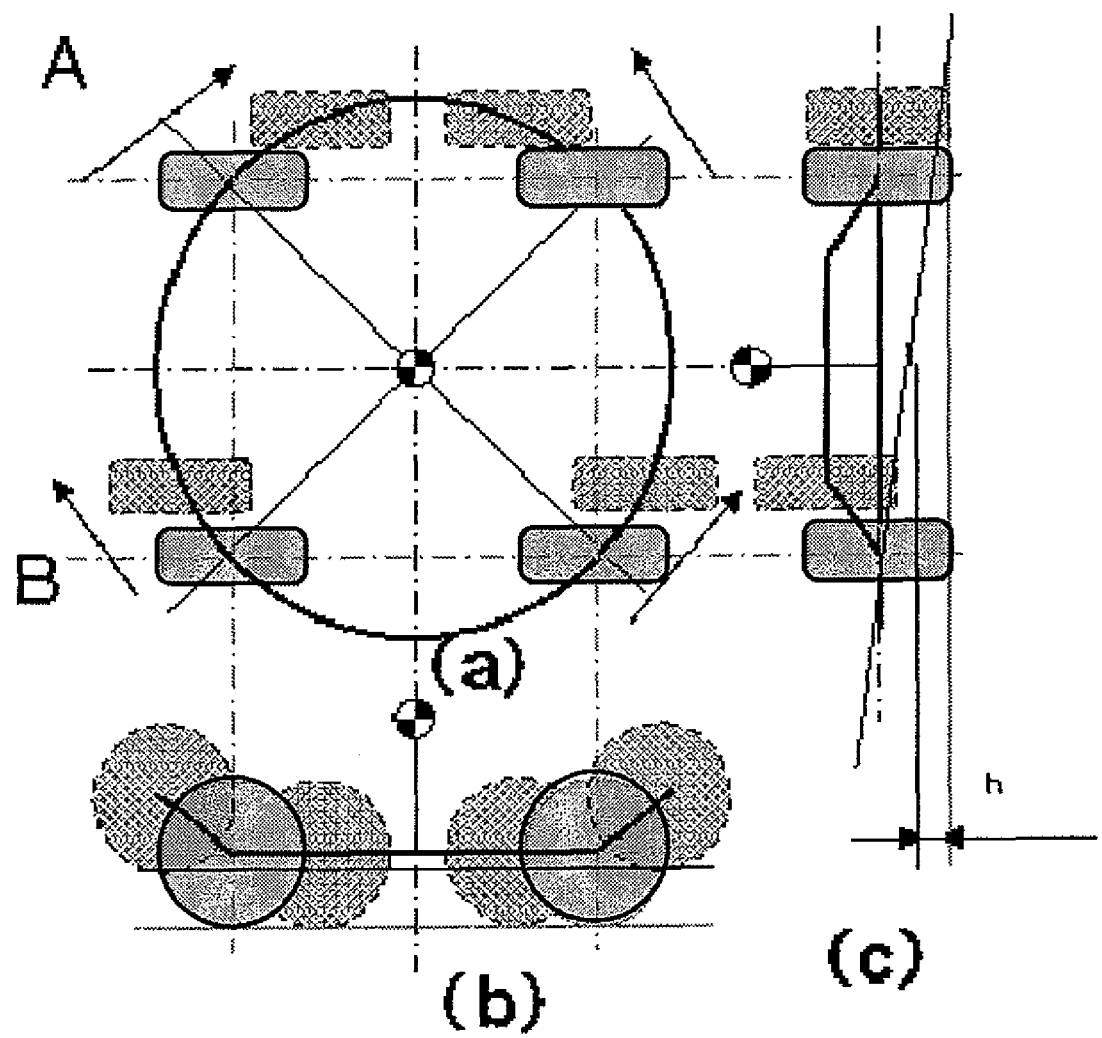
FIG. 18 shows another example of how the center of gravity of the vehicle changes when the wheels are moved along a wheel movement path in accordance with the fifth embodiment.
Figure 19:
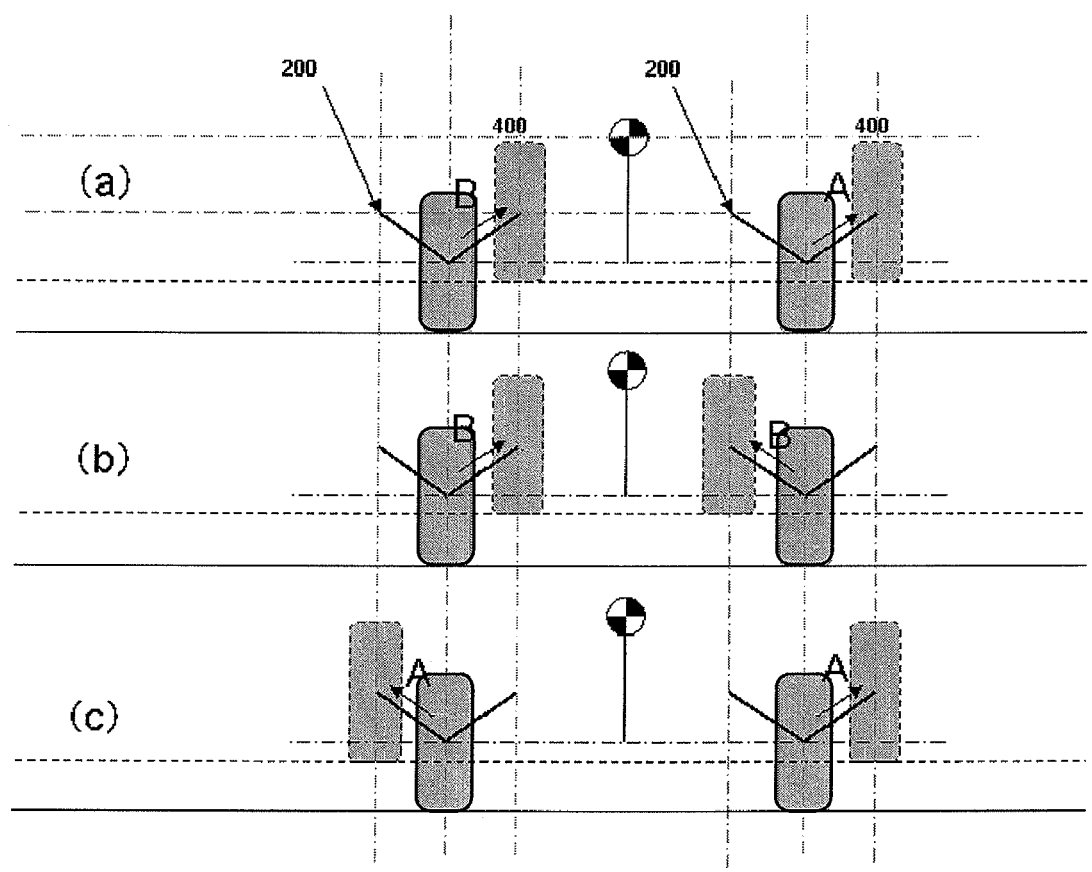
FIG. 19 shows an example of a wheel movement path in accordance with the fifth embodiment.

The manner in which the wheel units 400 (or 300) are moved along the wheel movement path 200 shown in FIG. 16 in relation to a change in the center of gravity is shown in diagrams (a) to (c) of FIG. 18 and diagrams (a) to (c) of FIG. 19.

Figure 17:
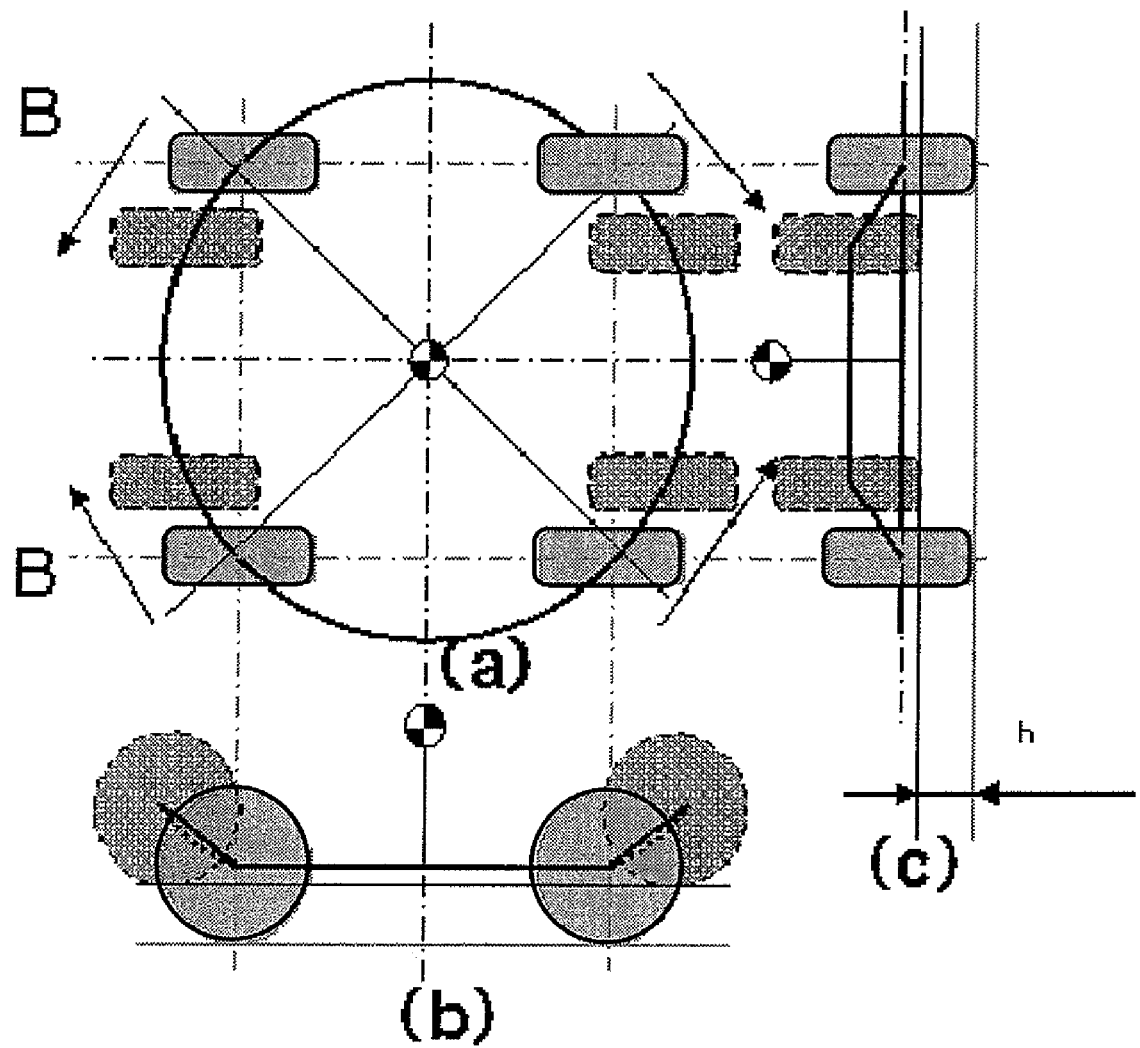
FIG. 17 shows an example of how the center of gravity of the vehicle changes when the wheels are moved along a wheel movement path in accordance with the fifth embodiment.

As shown in diagrams (a) to (c) of FIG. 17, the wheel movement path is configured such that when the wheel positions are moved along the direction of the arrows B from the reference positions such that the track width is reduced and the wheel base is elongated, the position of the center of gravity of the vehicle is lowered. As shown in FIG. 18, when the wheel units on one side are moved along the direction of the arrows B (i.e., in the direction reducing the track width and increasing the wheelbase) and the wheel units on the other side are moved along the direction of the arrows A (i.e., in the direction of increasing the track width and decreasing the wheelbase), the vehicle assumes a state in which it is slanted sideways and the center of gravity is unchanged.

Figure 20:
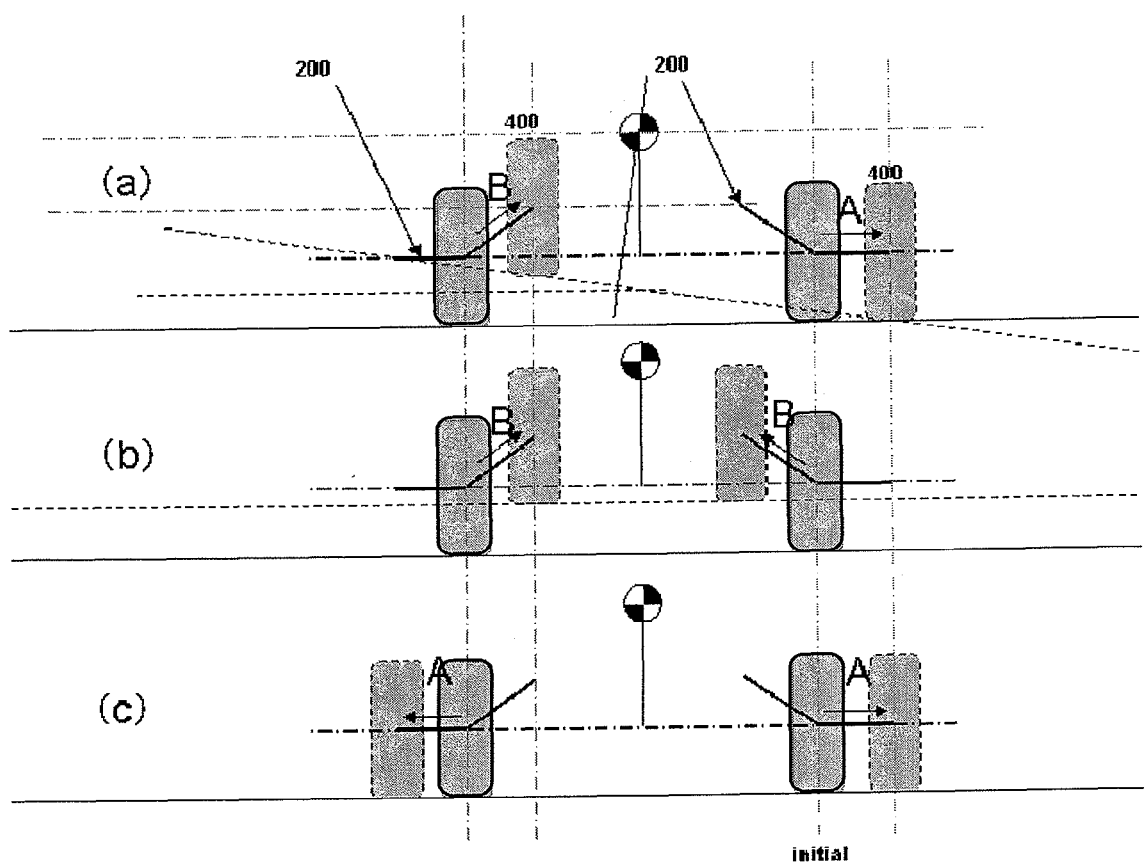
FIG. 20 shows another example of a wheel movement path in accordance with the fifth embodiment.

FIGS. 19 and 20 show two other preferred examples of wheel movement paths configured such that the wheels are moved in the vertical direction of the vehicle in addition to horizontally.

The wheel movement path shown in FIG. 19 is configured such that the position of the center of gravity is lowered when the wheels are moved in the direction of the arrows A, which is the direction of increasing track width and decreasing wheelbase. Similarly, the wheel movement path is configured such that the position of the center of gravity is lowered when the wheels are moved in the direction of the arrows B, which is the direction of decreasing track width and increasing wheelbase.

As shown in diagram (a) of FIG. 19, the center of gravity of the vehicle is lowered when the left and right wheel units are moved in opposite directions, e.g., the A direction and the B direction, respectively. Similarly, the center of gravity of the vehicle is lowered when both the left and the right wheel units are moved in the B direction as shown in diagram (b) of FIG. 19 or the A direction as shown in diagram (c) of FIG. 19.

With this configuration, the center of gravity always becomes lower when the wheel positions are moved. Consequently, the value of h in the equation set (1) of the first embodiment becomes smaller and the effect of moving the wheel positions is more marked. Thus, even if the wheel movement amount is small, the wheel positions can be controlled so as to achieve an equal wheel load distribution in the manner of the first embodiment.

The shape of the wheel movement path shown in FIG. 19 achieves favorable results when all of the wheels are moved by the same amount in the manner of the first embodiment because the all of the wheels have the same height position with respect to the center of gravity. Conversely, when a wheel bearing a larger wheel load is set as a base wheel (held fixed) and the other wheels are moved as in the fourth embodiment, the height of the base wheel is different and, thus, there are case in which the center of gravity of the vehicle is not moved to a favorable position. Therefore, the wheel movement path shown in FIG. 20 (same as in FIG. 17) is configured such that when a wheel is moved in the direction of the arrow A, i.e., in the direction of increasing track width and decreasing wheelbase, the height position of the wheel relative to the center of gravity of the vehicle does not change. Conversely, when a wheel is moved in the direction of the arrow B, i.e., in the direction of decreasing track width and increasing wheelbase, the height position of the wheel relative to the center of gravity of the vehicle changes such that the center of gravity is lowered.

As shown in diagram (a) of FIG. 20, when the left and right wheel units are moved in opposite directions, e.g., the A direction and the B direction, respectively, the wheel unit movement in the B direction causes the center of gravity of the vehicle to be lowered and the wheel unit movement in the A direction does not change the position of the center of gravity. Thus, the vehicle body becomes slanted. Similarly, the center of gravity of the vehicle is lowered when both the left and the right wheel units are moved in the B direction as shown in diagram (b) of FIG. 19 and the position of the center of gravity does not change when both the left and the right wheel units are moved in the A direction as shown in diagram (c) of FIG. 19.

With the wheel movement path shown in FIG. 20, the center of gravity of the vehicle does not change when the wheels are moved as shown in FIG. 11, which is the wheel movement used in the fourth embodiment when the vehicle is accelerating. Similarly, the center of gravity does not change when the wheels are moved as shown in FIG. 12 when the vehicle is decelerating.

Meanwhile, when the vehicle is turning and the wheels on the inside of the turn are moved as shown in FIG. 13, the vehicle height is lowered on the inward side of the vehicle (the side of the vehicle on the inside of the turn) and the vehicle behavior is stabilized even more than the fourth embodiment due to the roll counteracting effect of lowering the inward side of the vehicle. Therefore, the amount by which the wheels are moved can be reduced. When the wheel movement path is configured such that the vehicle tilts and the center of gravity of the vehicle changes when a wheel is moved in the A direction as shown in FIG. 11 or 12, the movement of the center of gravity acts to degrade the wheel load distribution and, thus, such a wheel movement path is not desirable. In short, the wheel movement path shown in FIG. 20 is preferable when a wheel (or wheels) bearing more of the wheel load is set as a base wheel and the other wheels are moved.

The selection of whether to use the wheel movement path shown in FIG. 19 or the wheel movement path shown in FIG. 20 depends on such factors as the capacity of the wheel movement actuators and the required vehicle performance. For example, if the wheel movement actuators are powerful and a high level of vehicle performance is required, then a vehicle with a high level of performance can be obtained by selecting the wheel movement path shown in FIG. 19 and executing wheel movement control in accordance with the first embodiment.

Conversely, if the required level of vehicle performance is not so high, then a lower cost vehicle can be obtained by selecting the wheel movement path shown in FIG. 20 and executing wheel movement control in accordance with the fourth embodiment.

In addition to rails configured as described above, there are other methods of achieving a wheel movement path that causes the wheel units to move vertically as well as horizontally. For example, a rotating screw or ball screw provided at the position where the wheel unit mounts to the vehicle body and contrived to raise and lower the suspension arm, a cam mechanism, or an arrangement in which a mounting shaft of the suspension arm is arranged in a slanted orientation can be used to make the wheel units move up and down as the move horizontally along the wheel movement path.

With these methods, the amount of vertical movement of movement path can be set freely instead of being predetermined based on the position of the wheel unit along the rail.

Effects of the fifth embodiment will now be explained. A vehicle with variable wheel geometry in accordance with the fifth embodiment achieves the effects listed below.

(15) The wheel movement path 200 is configured such that the wheel units are moved in the vertical direction of the vehicle as well as the horizontal direction, resulting in movement in three-dimensional space. Thus, when the positions of the wheels are changed, the vehicle height can be adjusted in addition to changing the track width and wheel base. As a result, the attitude of the vehicle can be controlled with a higher degree of freedom and the vehicle behavior can be improved to an even greater degree.

Sixth Embodiment

Figure 21A:
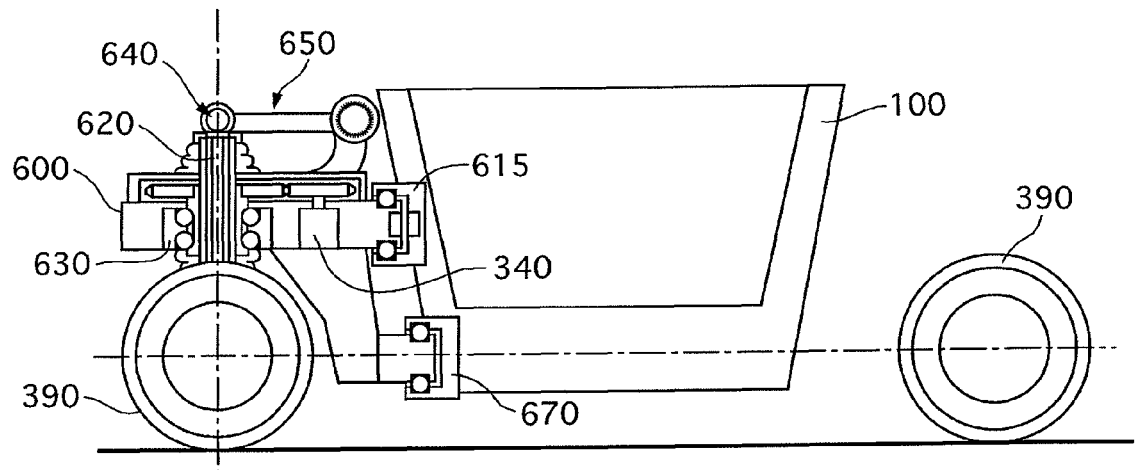
FIG. 21A is a simplified side view (selected portions shown in cross section) of a wheel mounting structure for the variable wheel positioning vehicle in accordance with a sixth embodiment.
Figure 21B:
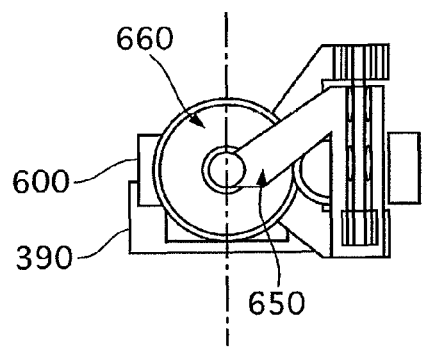
FIG. 21B is a simplified top view of selected portions shown of the wheel mounting structure for the variable wheel positioning vehicle in accordance with the sixth embodiment.

FIGS. 21A and 21B illustrate a wheel mounting structure for a vehicle with variable wheel geometry in accordance with a sixth embodiment. In the sixth embodiment, the suspension frame 600 is supported on the vehicle body 100 such that it can rotate relative to the vehicle body 100 by using an slider or rail 670 that is annular (ring-shaped) and arranged around a lower side portion of the vehicle body 100 and a linear motor slider or rail 615 that is annular and arranged around a middle side portion of the vehicle body 100. Otherwise, the constituent features are the same as the first embodiment shown in FIGS. 3A and 3B and explanations thereof are omitted for the sake of brevity. Since the suspension frame 600 is supported on the sides of the vehicle body, the center of gravity can be lowered further than in the first embodiment and the traveling stability can be increased more than in the first embodiment.

Seventh Embodiment

Figure 22A:
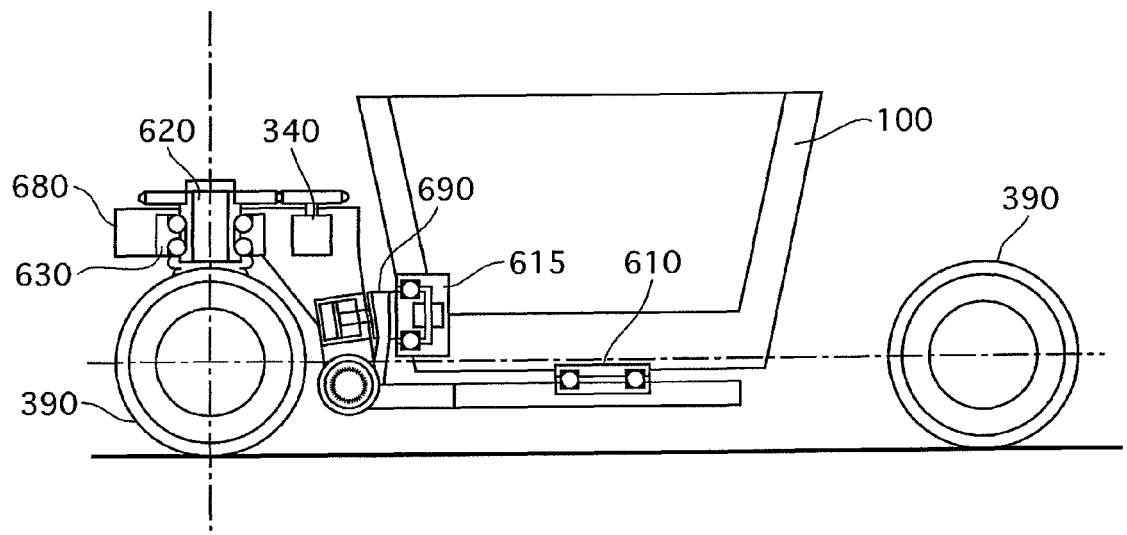
FIG. 22A is a simplified side view (selected portions shown in cross section) of a wheel mounting structure for the variable wheel positioning vehicle in accordance with a seventh embodiment.
Figure 22B:
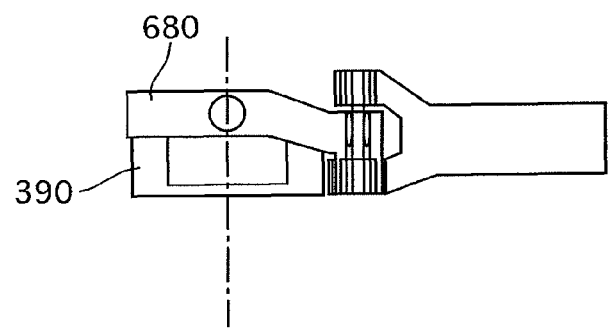
FIG. 22B is a simplified top view of selected portions shown of the wheel mounting structure for the variable wheel positioning vehicle in accordance with the seventh embodiment.

FIGS. 22A and 22B illustrate a wheel mounting structure for a vehicle with variable wheel geometry in accordance with a seventh embodiment. In the seventh embodiment, a training type suspension frame 680 is mounted to a bottom surface of the vehicle body 100 (or a bottom surface of another suspension frame) with a bearing 610 and a linear motor slider or rail 615 that is annular (ring-shaped) and arranged around a middle side portion of the vehicle body 100. Thus, the suspension frame 680 is supported such that it can be rotated with respect to the vehicle body 100.

A shock absorber 690 is provided between the linear motor slider 615 and the suspension frame 680 to absorb vibrations imparted to the wheel 390 from the road surface. Otherwise, the constituent features are the same as the first embodiment shown in FIG. 3 and explanations thereof are omitted for the sake of brevity. With the seventh embodiment, a comfortable ride and a pleasant traveling environment can be obtained because a shock absorber 690 is provided between the suspension frame 680 and the vehicle body 100.

Eighth Embodiment

Figure 23A:
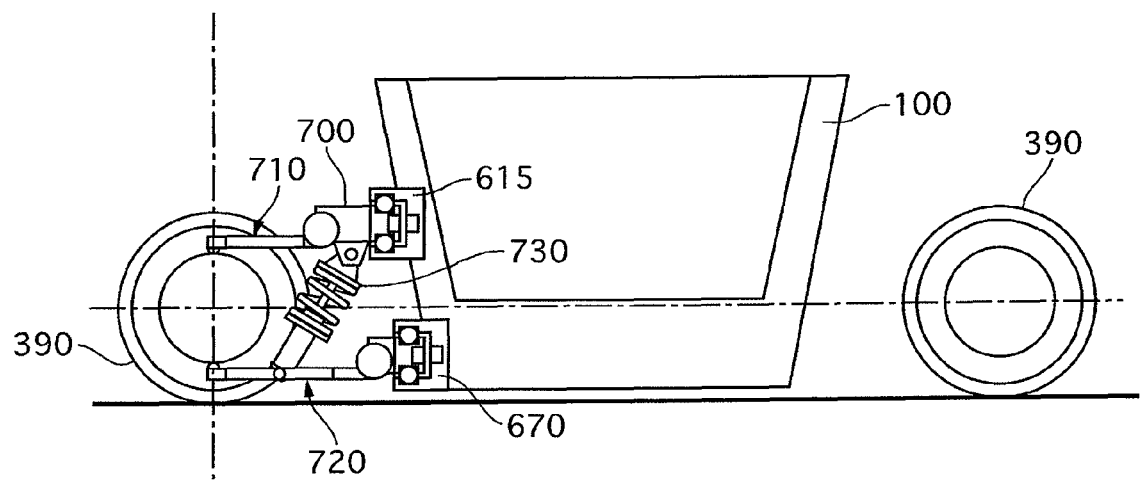
FIG. 23A is a simplified side view (selected portions shown in cross section) of a wheel mounting structure for the variable wheel positioning vehicle in accordance with an eighth embodiment.
Figure 23B:
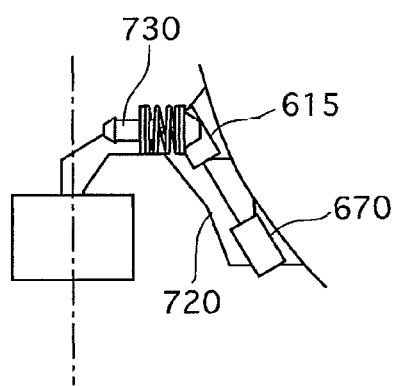
FIG. 23B is a simplified top view of selected portions shown of the wheel mounting structure for the variable wheel positioning vehicle in accordance with the eighth embodiment.

FIGS. 23A and 23B illustrate a wheel mounting structure for a vehicle with variable wheel geometry in accordance with an eighth embodiment. The eighth embodiment employs a double wishbone suspension frame 700 configured to suspend a wheel 390 with an upper arm 710 and a lower arm 720. The upper arm 710 is supported on a linear motor slider or rail 615 that is annular in shape and arranged around a middle side portion of the vehicle body 100, and the lower arm 720 is supported on a slider or rail 670 that is annular in shape and arranged around a lower side portion of the vehicle body 100. A shock absorber 730 is arranged between the upper arm 710 and the lower arm 720.

By using a double wishbone suspension frame 700, the eighth embodiment enables alignment changes and the vehicle attitude during acceleration/deceleration to be controlled with a greater degree of freedom by adjusting the shape and arrangement of the arms. Additionally, the rigidity of a double wishbone suspension is high and, thus, the steering performance and stability are improved.

Ninth Embodiment

Figure 24A:
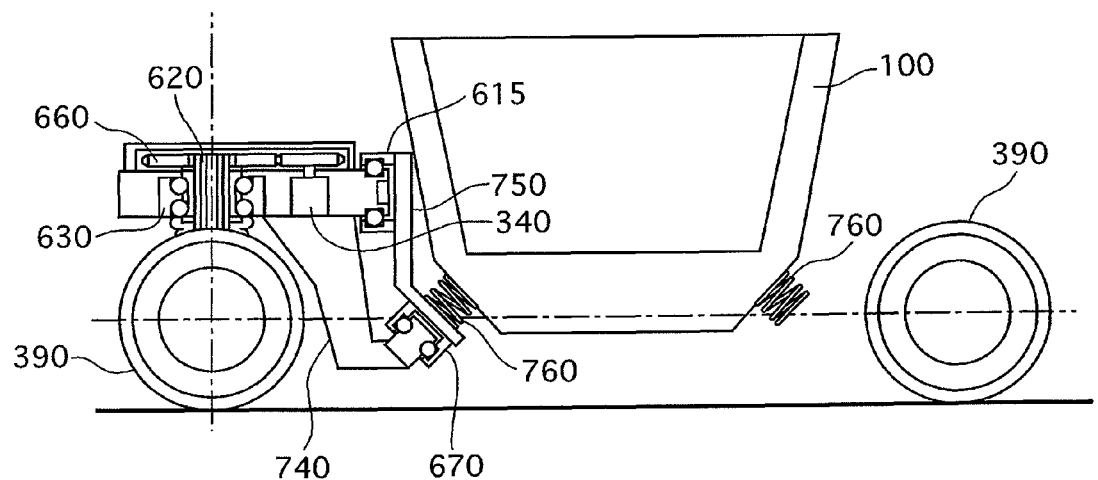
FIG. 24A is a simplified side view (selected portions shown in cross section) of a wheel mounting structure for the variable wheel positioning vehicle in accordance with a ninth embodiment.
Figure 24B:
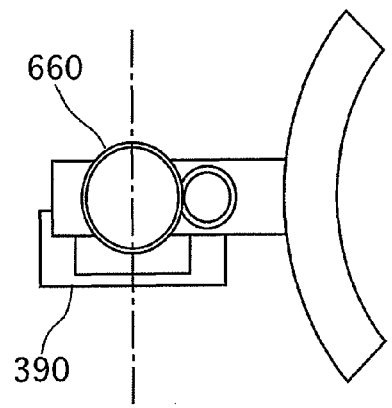
FIG. 24B is a simplified top view of selected portions shown of the wheel mounting structure for the variable wheel positioning vehicle in accordance with the ninth embodiment.

FIGS. 24A and 24B illustrate a wheel mounting structure for a vehicle with variable wheel geometry in accordance with a ninth embodiment. The ninth embodiment employees a floating cabin type suspension frame 740 arranged between the vehicle body 100 and a vibration damping member 750. The suspension frame 740 is supported on the vehicle body 100 such that it can rotate relative to the vehicle body 100 by using an slider or rail 670 arranged around a lower side portion of the damping member 750 and a linear motor slider or rail 615 that is annular and arranged around an upper side portion of the damping member 750. A lower end portion of the damping member 750 is fixed to the vehicle body 100 through a coil spring 760. Otherwise, the constituent features are the same as the first embodiment shown in FIG. 2 and explanations thereof are omitted for the sake of brevity. With the ninth embodiment, a comfortable ride and a pleasant traveling environment can be obtained because a floating cabin type suspension frame 740 is used.

Tenth Embodiment

Figure 25A:
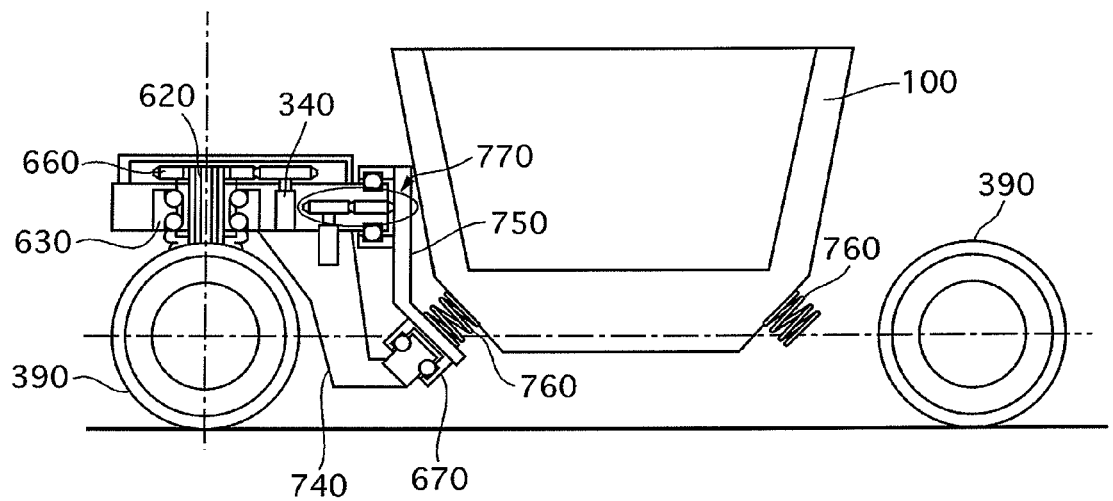
FIG. 25A is a simplified side view (selected portions shown in cross section) of a wheel mounting structure for the variable wheel positioning vehicle in accordance with a tenth embodiment.
Figure 25B:
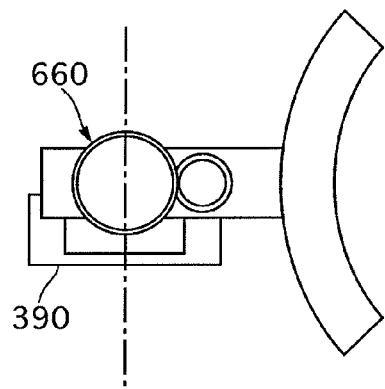
FIG. 25B is a simplified top view of selected portions shown of the wheel mounting structure for the variable wheel positioning vehicle in accordance with the tenth embodiment.

FIGS. 25A and 25B illustrate a wheel mounting structure for a vehicle with variable wheel geometry in accordance with a tenth embodiment. In the tenth embodiment, the suspension frame 740 is supported on the vehicle body 100 such that it can rotate relative to the vehicle body 100 by using an slider 670 arranged around a lower side portion of the damping member 750 and a gear drive 770 that is annular and arranged around an upper side portion of the damping member 750. Otherwise, the constituent features are the same as in the first embodiment and explanations thereof are omitted for the sake of brevity.

Eleventh Embodiment

Figure 26A:
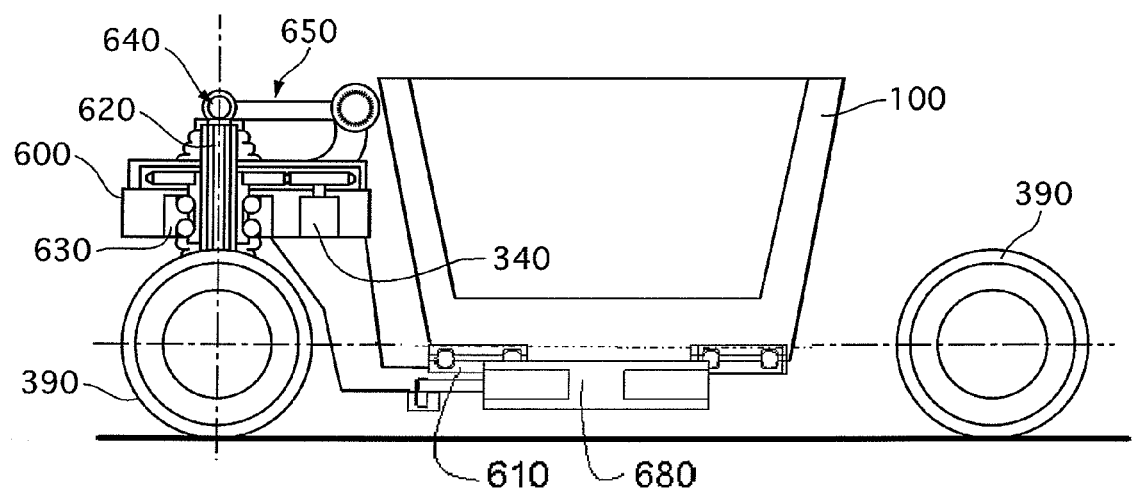
FIG. 26A is a simplified side view (selected portions shown in cross section) of a wheel mounting structure for the variable wheel positioning vehicle in accordance with an eleventh embodiment.
Figure 26B:
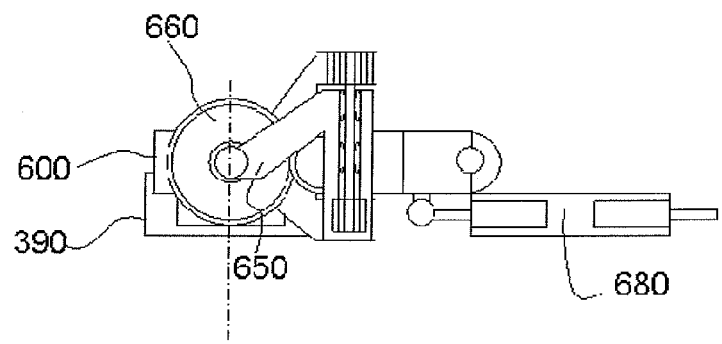
FIG. 26B is a simplified top view of selected portions shown of the wheel mounting structure for the variable wheel positioning vehicle in accordance with the eleventh embodiment.
Figure 26C:
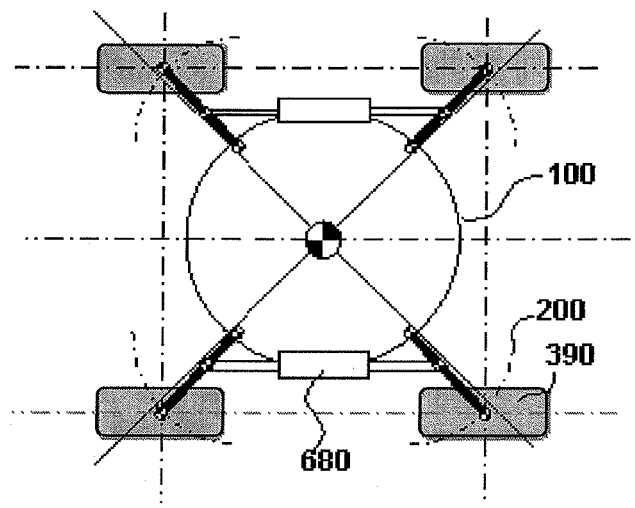
FIG. 26C is a schematic top plan view of the variable wheel positioning vehicle with the variable wheel geometry in accordance with the eleventh embodiment.

FIGS. 26A to 26C illustrate a wheel mounting structure for a vehicle with variable wheel geometry in accordance with an eleventh embodiment. In the eleventh embodiment, each suspension frame 600 is mounted to a different location of the vehicle body 100 through a bearing 610 that is provided on a bottom surface of the vehicle body 100 (or a bottom surface of another suspension frame). Linear actuators (cylinders) 680 provided on a lower side portion of the vehicle body 100 serve as the track width and wheelbase changing actuators 350. By extending and retracting a rod of each linear actuator 680, each suspension frame 600 is made to pivot about a mounting part as shown in FIG. 26C. Otherwise, the constituent features are the same as in the first embodiment and explanations thereof are omitted for the sake of brevity. With this embodiment, larger actuators can be used because the linear actuators are arranged on the vehicle body.

Twelfth Embodiment

Figure 27A:
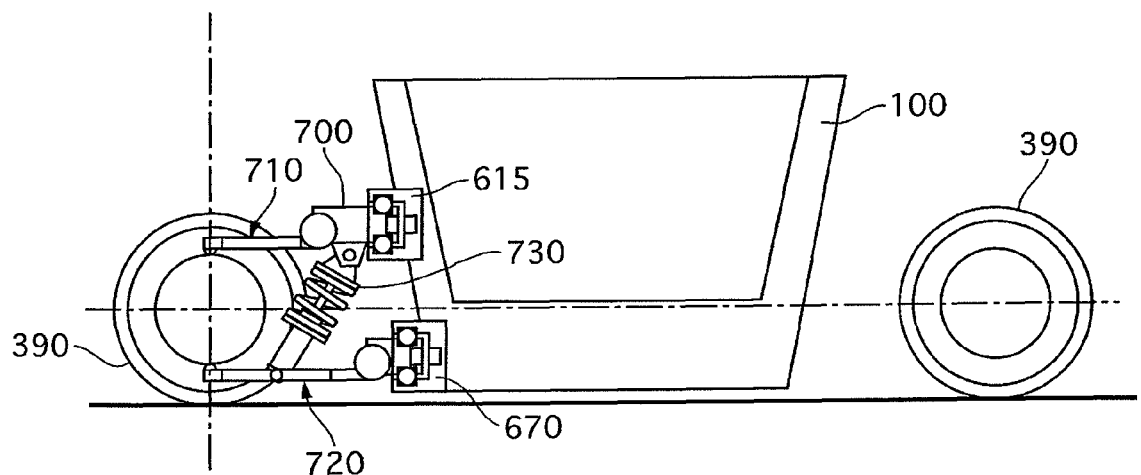
FIG. 27A is a simplified side view (selected portions shown in cross section) of a wheel mounting structure for the variable wheel positioning vehicle in accordance with a twelfth embodiment.
Figure 27B:
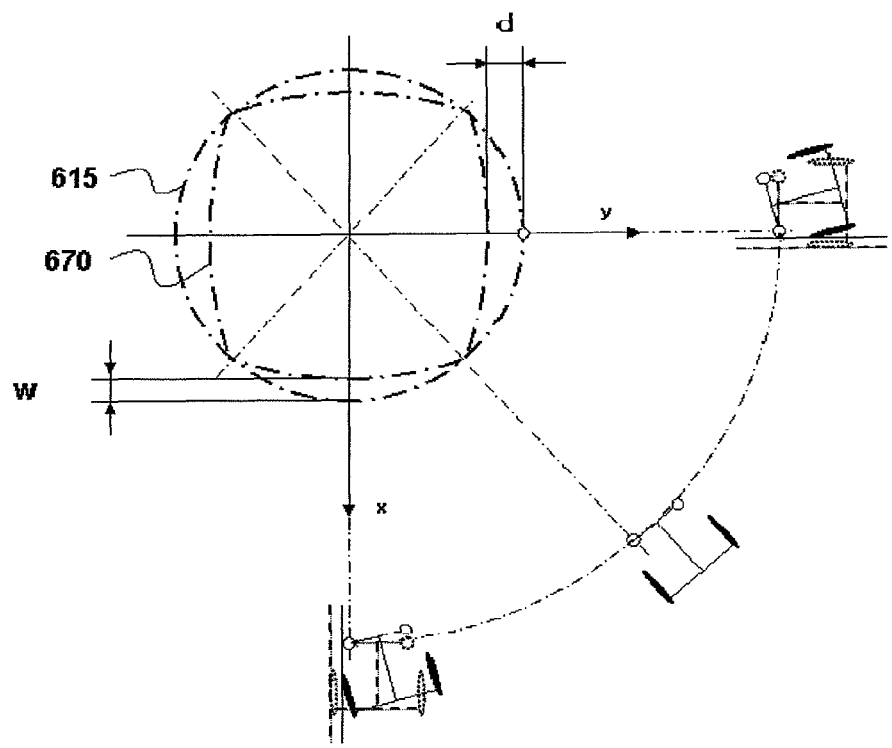
FIG. 27B is a schematic top plan view of the variable wheel positioning vehicle with the variable wheel geometry in accordance with the twelfth embodiment.

FIGS. 27A and 27B illustrate a wheel mounting structure for a vehicle with variable wheel geometry in accordance with a twelfth embodiment.

As shown in FIG. 27B, the twelfth embodiment employs a double wishbone type suspension frame 700 configured to suspend a wheel 390 with an upper arm 710 and a lower arm 720. The upper arm 710 is supported on a linear motor slider or rail 615 that is annular in shape and arranged around a middle side portion of the vehicle body 100, and the lower arm 720 is supported on a slider 670 that is annular in shape and arranged around a lower side portion of the vehicle body 100. A shock absorber 730 is arranged between the upper arm 710 and the lower arm 720.

With this embodiment, as shown in FIG. 27A, the slider 670 and the linear slider 615 are shaped differently. The combination of the difference in shape and the vertical spacing of the slider 670 and the linear slider 615 causes the wheel units to be moved vertically when the track width and wheelbase are changed. Otherwise, the constituent features are the same as in the first embodiment and explanations thereof are omitted for the sake of brevity.

With the twelfth embodiment, the vertical wheel movement achieved with the fifth embodiment can be achieved with a simpler structure.

Other Embodiments

Although preferred embodiments of the present invention are described in the preceding paragraphs, the specific constituent features of the invention are not limited to those described heretofore. Various design modifications can be made without departing from the scope of the invention.

Figure 28:
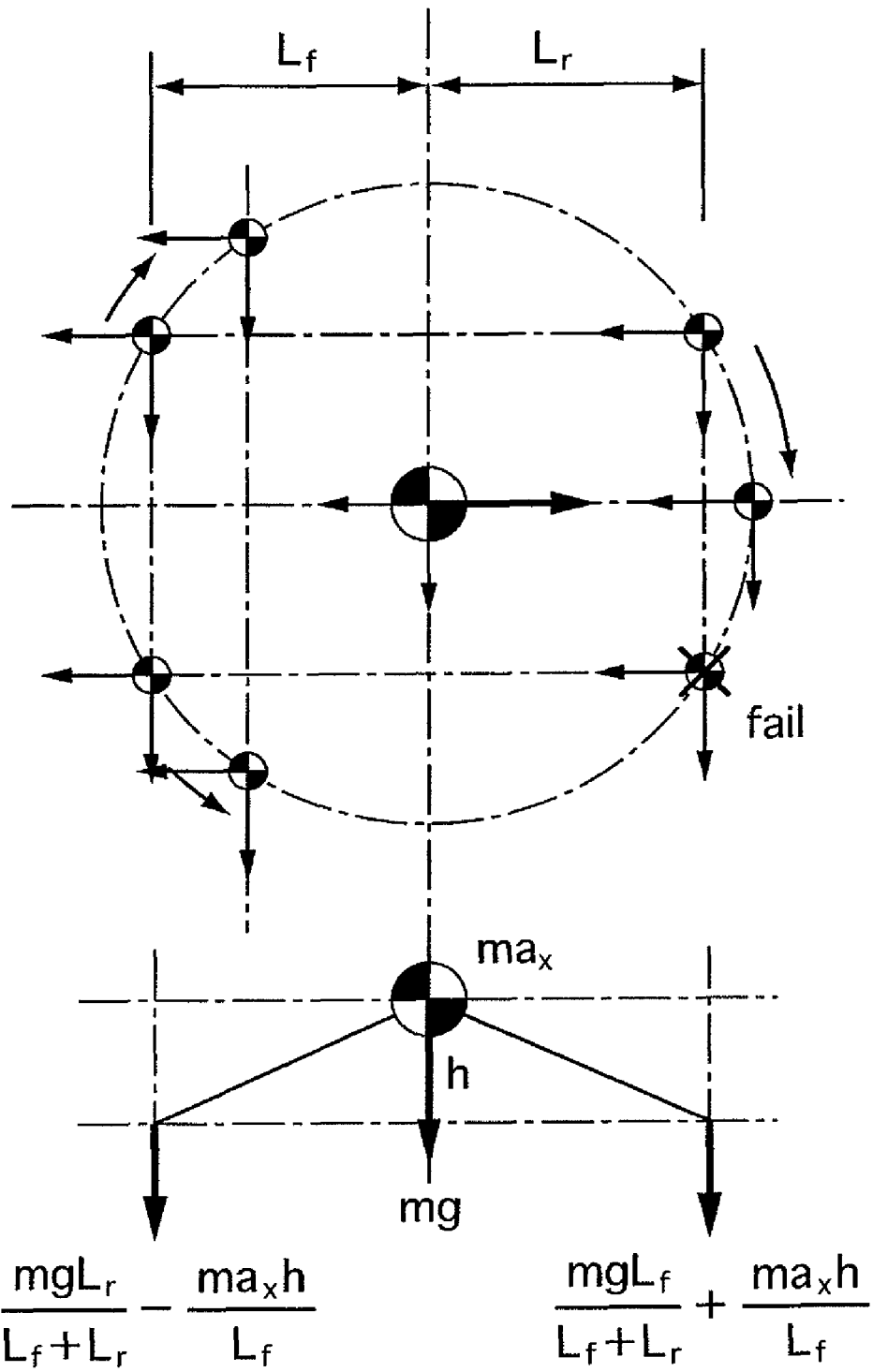
FIG. 28 shows a wheel arrangement used in the first embodiment when a drive wheel fails.

FIG. 28 illustrates an example of a wheel arrangement used when one of the drive wheels has failed and the vehicle is being accelerated with only one drive wheel. The remaining drive wheel (normal drive wheel) is arranged at the longitudinal centerline of the vehicle. If the position of the normal drive wheel were not changed, the driving force exerted by the remaining drive wheel would cause a yaw moment to develop and the turning performance of the vehicle would be degraded.

Conversely, by moving the remaining drive wheel to a position on the longitudinal centerline of the vehicle as shown in FIG. 28 when one of the drive wheels has failed, the development of a moment resulting from the driving force exerted by the remaining drive wheel is prevented. As a result, a yaw moment can be avoided when a drive wheel fails and stable travel can be continued.

Figure 29:
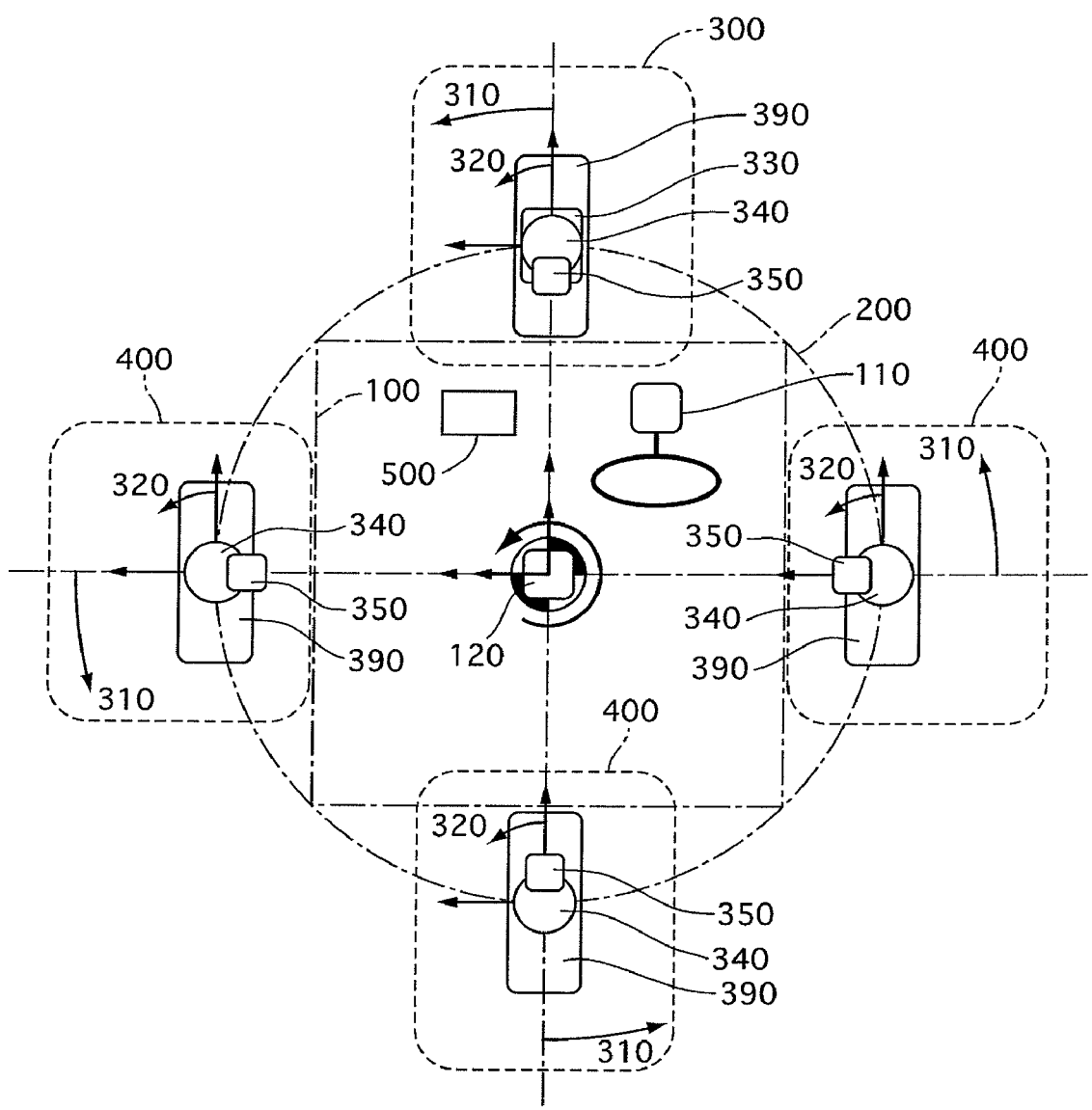
FIG. 29 is a schematic top plan view of the variable wheel positioning vehicle with the variable wheel geometry in accordance with a variation of the first embodiment.

FIG. 29 is a top plan view of another example of a vehicle with variable wheel geometry. This vehicle is a front-wheel drive vehicle having one drive wheel unit 300 arranged in a frontward middle position of the vehicle body 100 and three non-drive wheel units 400. One of the non-drive units 400 is arranged in a rearward middle position of the vehicle body 100 and the other two non-drive wheel units 400 are arranged to the left and right of the center of gravity of the vehicle body 100.

Figure 30:
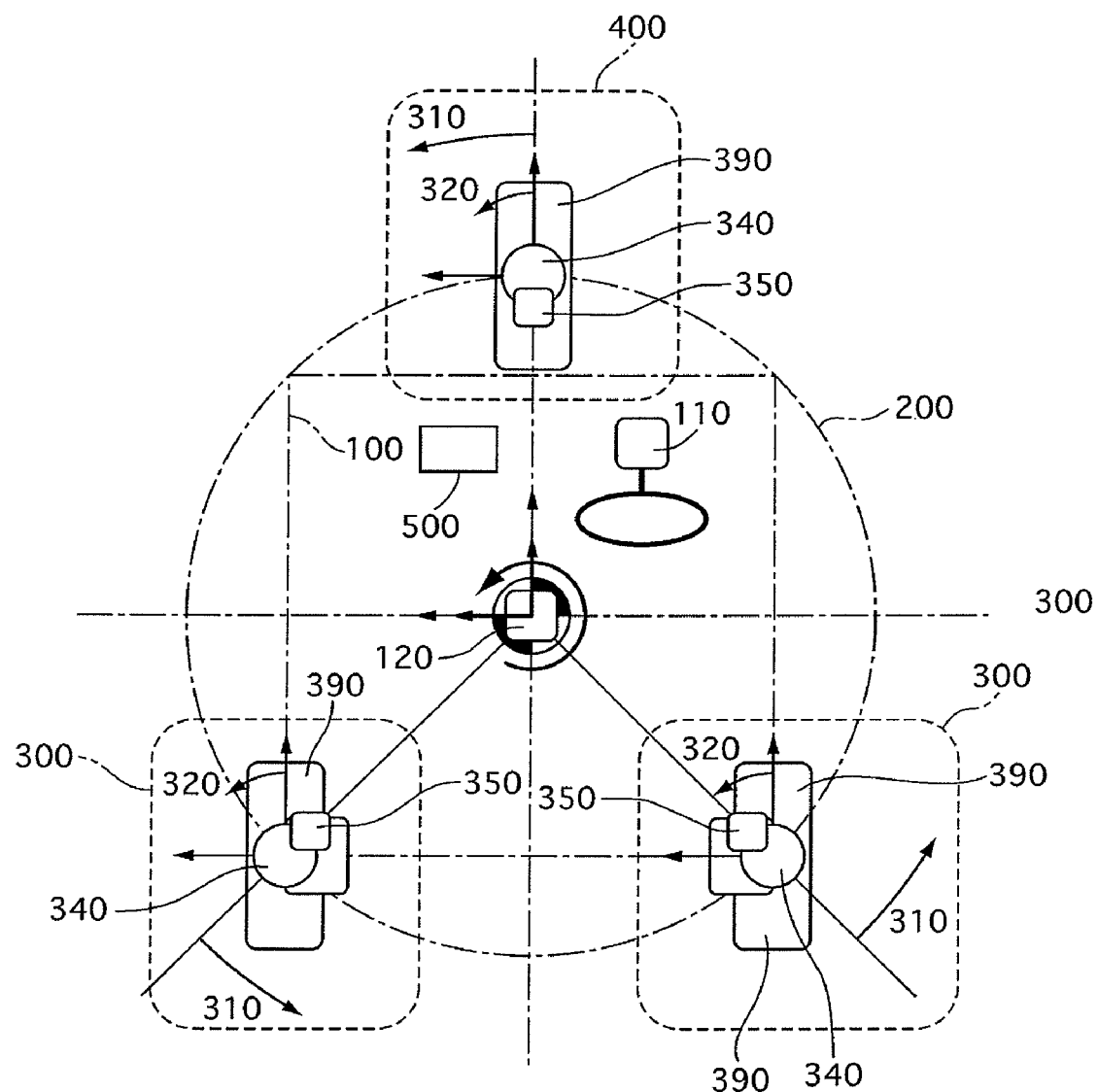
FIG. 30 is a schematic top plan view of the variable wheel positioning vehicle with the variable wheel geometry in accordance with a variation of the first embodiment.

FIG. 30 is a top plan view of another example of a vehicle with variable wheel geometry. This vehicle is a three-wheeled rear-wheel drive vehicle having one non-drive wheel unit 400 in the front and two drive wheel units 300 in the rear.

Figure 31:
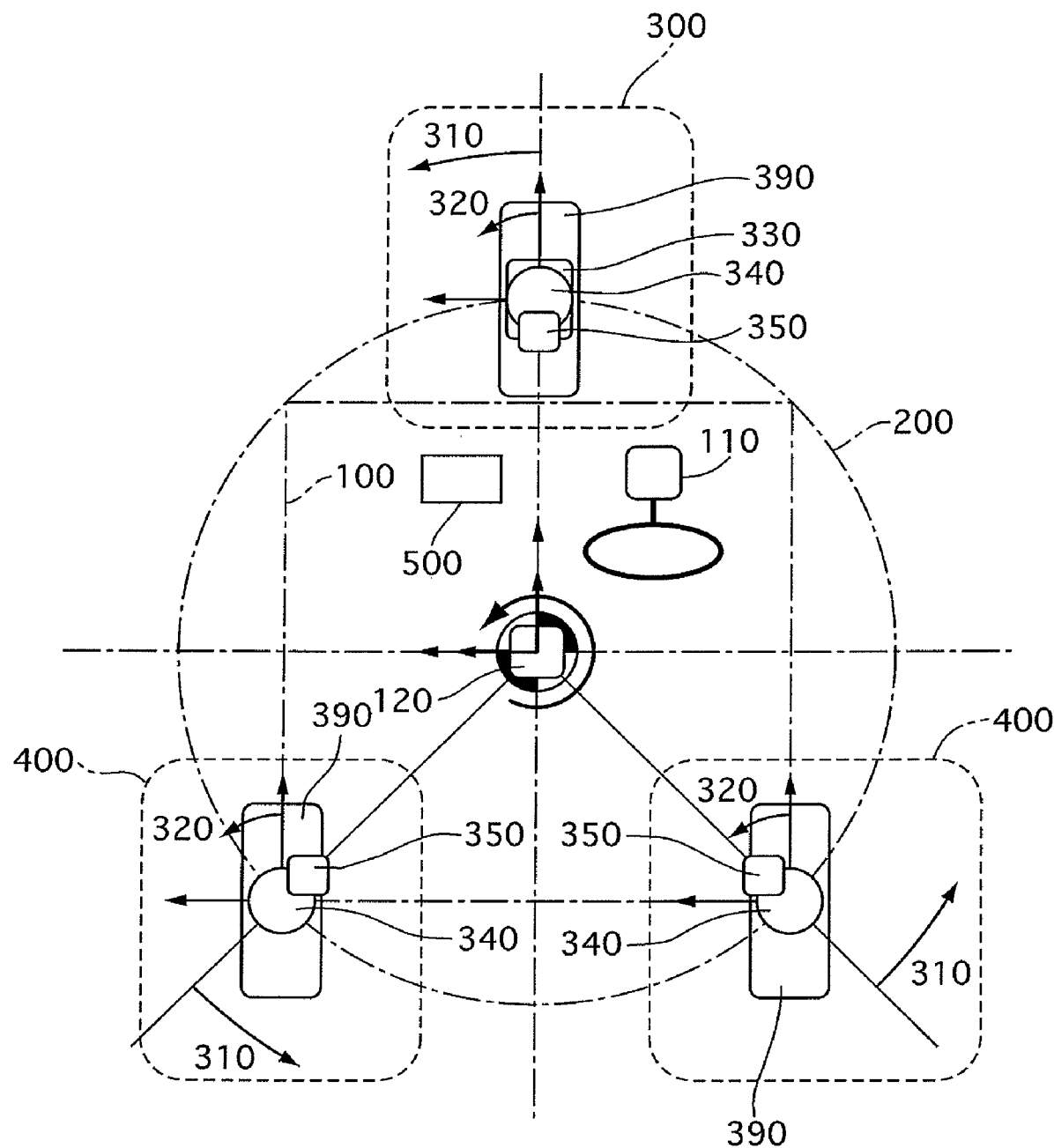
FIG. 31 is a schematic top plan view of the variable wheel positioning vehicle with the variable wheel geometry in accordance with a variation of the first embodiment.

FIG. 31 is a top plan view of another example of a vehicle with variable wheel geometry. This vehicle is a three-wheeled front-wheel drive vehicle having one drive wheel unit 300 in the front and two non-drive wheel units 400 in the rear.

Figure 32:
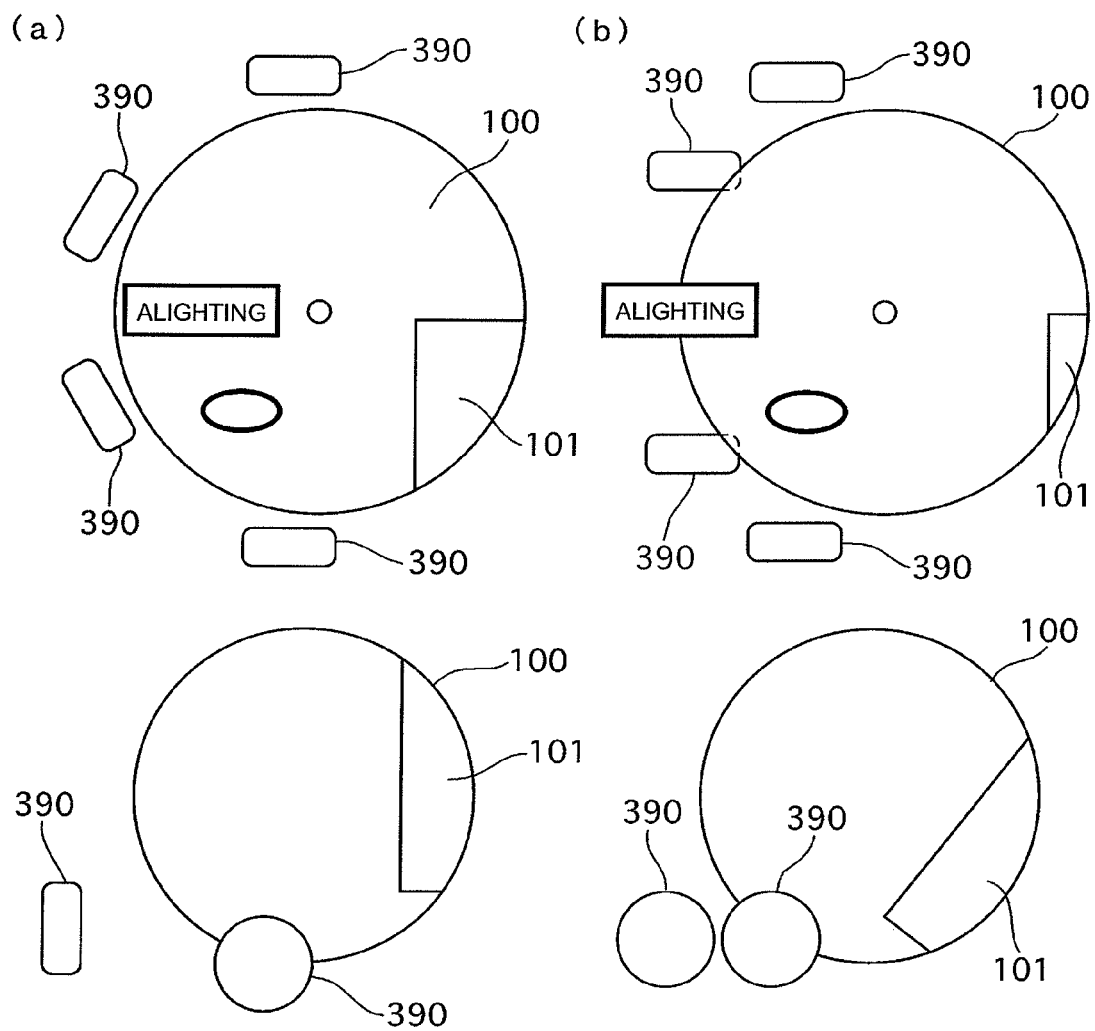
FIG. 32 is a series of schematic views of the variable wheel positioning vehicle to show an example of the operation of the first embodiment.

Diagrams (a) and (b) of FIG. 32 shows an example of a vehicle contrived to change the wheel positions so as to bring a boarding entryway (e.g., a door) closer to the road surface to facilitate convenient boarding and alighting (getting in and out of vehicle). When boarding or alighting, as shown in diagram (a) of FIG. 32, first the steering actuators 340 are driven from the orientation of diagram (a) of FIG. 32 so as to orient the wheels 390 in the same direction as the wheel unit movement path 200 as seen in diagram (b) of FIG. 32. The track width and wheelbase changing actuators 350 are then driven so as to move the wheels 390 to the opposite side of the vehicle as the boarding entryway 101. As a result, as shown in diagram (b) of FIG. 32, the boarding entryway 101 can be brought closer to the road surface and fully flat boarding and alighting can be accomplished.

In this example, all of the wheels 390 are not moved at the same time when the wheel positions are changed. Instead, one wheel is set as a base wheel (held fixed) and the positions of the other wheels are changed. When this is done, the vehicle body 100 can be prevented from rotating by setting the direction of the base wheel 390 to be different from the direction of the wheel unit movement path 200.

Figure 33:
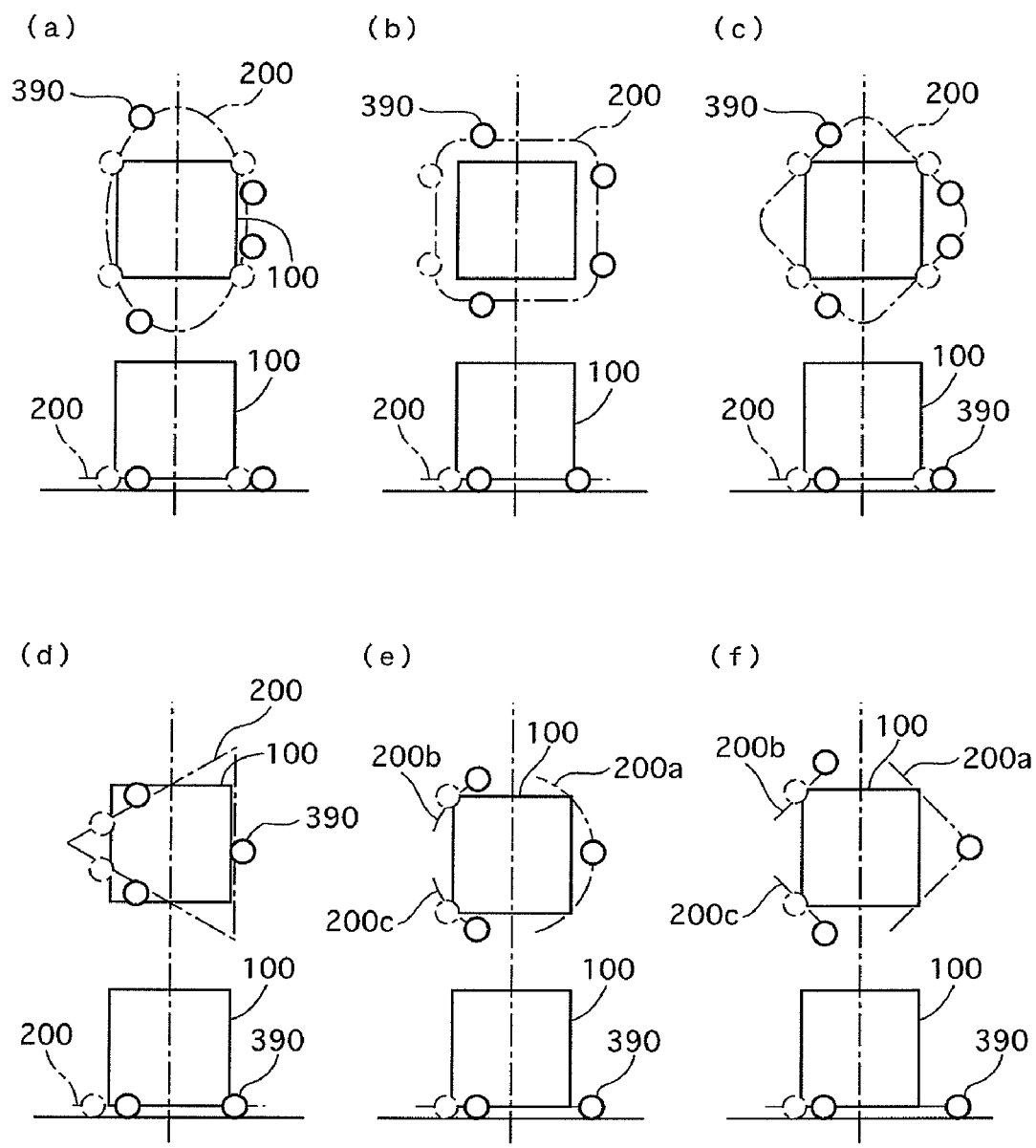
FIG. 33 is a series of schematic views of various variable wheel positioning vehicles in accordance with some alternative embodiments.

Although in the preceding embodiments the wheel unit movement path 200 is circular in a top plan view, the shape of the movement path can be set freely as required. FIG. 33 shows examples in which the shape of the movement path 200 is other than circular in shape. An elliptical (oval) movement path is shown in diagram (a) of FIG. 33. A rectangular movement path is shown in diagram (a) of FIG. 33. A diamond shaped movement path is shown in diagram (c) of FIG. 33. A triangular movement path is shown in diagram (d) of FIG. 33. Furthermore, the shape of the wheel unit movement path 200 is not limited to continuous loop. As shown in diagrams (e) and (f) of FIG. 33, it is acceptable to provide a plurality of non-continuous paths 200a, 200b and 200c whose lengths are set in accordance with the required movement range of the wheels 390. Additionally, it is acceptable to use a combination of two or more of the control schemes described regarding each of the embodiments.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A variable wheel positioning vehicle comprising:
a vehicle body with a center of gravity;
a plurality of wheels rotatably mounted with respect to the vehicle body;
a suspension device operatively arranged between the wheels and the vehicle body;
a steering mechanism operatively coupled to the suspension device to change a direction of at least one of the wheels with respect to the vehicle body;
a drive device operatively coupled to drive at least one of the wheels;
a wheel position changing mechanism operatively coupled to the suspension device to move the suspension device and all of the wheels along a movement path with respect to the vehicle body and to hold the suspension device and all of the wheels at any position along the movement path, with all of the wheels being horizontally moved with respect to the vehicle body around a center point located near the center of gravity of the vehicle body by the wheel position changing mechanism, the movement path having an axis at the center point; and
a wheel position control device operatively coupled to the wheel position changing mechanism to issue a movement command to the wheel position changing mechanism that changes a wheel positioning distance between a center rotation axis of one of the wheels and the center of gravity of the vehicle body as measured in a direction parallel to an acceleration direction of the center of gravity of the vehicle body based on a traveling condition of the vehicle,
the wheel position control device being configured to select at least one of the wheels that is closest to the acceleration direction of the center of gravity as a base wheel to be held fixed and to change wheel positions of selected remaining ones of the wheels upon the wheel position control device changes the wheel positions.

2. The variable wheel positioning vehicle as recited in claim 1, wherein
the wheel position changing mechanism is operatively coupled to the suspension device to move the suspension device horizontally about the center point located at a single position of the vehicle body to change a wheel position such that a track width and a wheel base of the vehicle are changed.

3. The variable wheel positioning vehicle as recited in claim 1, wherein
the wheel movement path of the wheel position changing mechanism is configured such that at least one of the wheels is horizontally movable about the center point located at a single position of the vehicle and displaceable in a vertical direction of the vehicle in conjunction with horizontal movement.

4. The variable wheel positioning vehicle as recited in claim 1, wherein
the wheel position control device is further configured to control the wheel position changing mechanism such that the wheel positioning distance to the center of gravity from the base wheel becomes larger than the wheel positioning distance to the center of gravity from one of the wheels that is located opposite the acceleration direction.

5. The variable wheel positioning vehicle as recited in claim 1, wherein
the wheel position control device is further configured to change a wheel position of at least one of the wheels based on a target wheel load that is calculated based on making a wheel load of a drive wheel of the wheels larger than a wheel load of a non-drive wheel of the wheels.

6. The variable wheel positioning vehicle as recited in claim 1, wherein
the wheel position control device is further configured to change wheel positions of at least one of the wheels based on a target wheel load that is calculated based on a target vehicle attitude.

7. The variable wheel positioning vehicle as recited in claim 1, wherein
the wheel position changing mechanism includes
a suspension device frame configured to support the suspension device;
a bearing supporting the suspension device frame with respect to the vehicle body at an end of the suspension device frame that is opposite an end that supports the suspension device and to support the suspension device frame such that the suspension device frame can rotate relative to the vehicle body; and
an actuator provided on one of the suspension device and the suspension device frame to move the suspension device relative to the vehicle body.

8. The variable wheel positioning vehicle as recited in claim 1, wherein
the wheel position changing mechanism includes
a slider extending around a periphery of the vehicle body and supporting the suspension device; and
an actuator provided on the suspension device to move the suspension device relative to the vehicle body.

9. The variable wheel positioning vehicle as recited in claim 1, wherein
the wheel position changing mechanism includes
a suspension device frame supporting the suspension device and responding to a collapsible part configured to collapse in response to a force imparted to the wheels from a road surface,
a bearing supporting the suspension device frame with respect to the vehicle body at an end of the suspension device frame that is opposite an end that supports the suspension device and to support the suspension device frame such that the suspension device frame can rotate relative to the vehicle body,
a slider extending around a periphery of the vehicle body and supporting the suspension device,
an actuator provided on one of the suspension device and the suspension device frame to move the suspension device relative to the vehicle body, and
a shock absorber provided between the slider and the suspension device.

10. The variable wheel positioning vehicle as recited in claim 1, wherein
the suspension device is a double wishbone suspension device; and
the wheel position changing mechanism includes
a first slider extending around a periphery of the vehicle body and supporting a lower arm of the suspension device, a second slider extending around a periphery of the vehicle body and supporting support an upper arm of the suspension device, and an actuator coupled one of the upper and lower arms of the suspension device to move the suspension device relative to the vehicle body.

11. The variable wheel positioning vehicle as recited in claim 1, wherein the wheel position changing mechanism includes a suspension device frame supporting the suspension device, a slider provided on an intermediate member and supporting the suspension device frame at an end of the suspension device frame that is opposite an end that supports the suspension device, and an actuator provided on one of the suspension device and the suspension device frame to move the suspension device relative to the intermediate member, the intermediate member being mounted to the vehicle body with a spring element disposed therebetween.

12. The variable wheel positioning vehicle as recited in claim 1, wherein the wheel position changing mechanism includes a suspension device frame supporting the suspension device, and a bearing supporting the suspension device frame with respect to the vehicle body at an end of the suspension device frame that is opposite an end that supports the suspension device and supporting the suspension device frame such that the suspension device frame can rotate relative to the vehicle body, the bearing being arranged at corners of the vehicle body with respect to each of the wheels.

13. The variable wheel positioning vehicle as recited in claim 12, wherein the wheel position changing mechanism includes a linear actuator mounted to the vehicle body and connected to the suspension device frame at a position that is separated from the end of the suspension device frame that is supported with respect to the vehicle body.

14. The variable wheel positioning vehicle as recited in claim 1, wherein the wheel position changing mechanism includes a first slider extending around a periphery of the vehicle body and supporting an upper part of the suspension device with a first movement path, a second slider extending around a periphery of the vehicle body and supporting a lower part of the suspension device with a second movement path that is different from the first movement path, and an actuator provided on the suspension device to move the suspension device relative to the vehicle body.

15. A variable wheel positioning vehicle comprising:

a vehicle body with a center of gravity;

a plurality of wheels rotatably mounted with respect to the vehicle body;

a suspension device operatively arranged between the wheels and the vehicle body;

a steering mechanism operatively coupled to the suspension device to change a direction of at least one of the wheels with respect to the vehicle body;

a drive device operatively coupled to drive at least one of the wheels;

a wheel position changing mechanism operatively coupled to the suspension device to move the suspension device and all of the wheels along a movement path with respect to the vehicle body and to hold the suspension device and all of the wheels at any position along the movement path, with all of the wheels being horizontally moved with respect to the vehicle body around a center point located near the center of gravity of the vehicle body by the wheel position changing mechanism; and a wheel position control device operatively coupled to the wheel position changing mechanism to issue a movement command to the wheel position changing mechanism that changes a wheel positioning distance between a center rotation axis of one of the wheels and the center of gravity of the vehicle body as measured in a direction parallel to an acceleration direction of the center of gravity of the vehicle body based on a traveling condition of the vehicle, the wheel position changing mechanism being operatively coupled to the suspension device to move the suspension device horizontally about the center point located at a single position of the vehicle body to change a wheel position such that a track width and a wheel base of the vehicle are changed, and the wheel position changing mechanism being operatively coupled to the suspension device such that the wheel movement path forms a single annular path with all of the wheels being horizontally movable about the center point without changing a distance between the center point and the wheels, the wheel position control device being configured to select at least one of the wheels that is closest to the acceleration direction of the center of gravity as a base wheel to be held fixed and to change wheel positions of selected remaining ones of the wheels upon the wheel position control device changes the wheel positions.

16. A variable wheel positioning vehicle comprising:

a vehicle body with a center of gravity;

a plurality of wheels rotatably mounted with respect to the vehicle body;

a suspension device operatively arranged between the wheels and the vehicle body;

a steering mechanism operatively coupled to the suspension device to change a direction of at least one of the wheels with respect to the vehicle body;

a drive device operatively coupled to drive at least one of the wheels;

a wheel position changing mechanism operatively coupled to the suspension device to move the suspension device and all of the wheels along a movement path with respect to the vehicle body and to hold the suspension device and all of the wheels at any position along the movement path, with all of the wheels being horizontally moved with respect to the vehicle body around a center point located near the center of gravity of the vehicle body by the wheel position changing mechanism;

a wheel position control device operatively coupled to the wheel position changing mechanism to issue a movement command to the wheel position changing mechanism that changes a wheel positioning distance between a center rotation axis of one of the wheels and the center of gravity of the vehicle body as measured in a direction parallel to an acceleration direction of the center of gravity of the vehicle body based on a traveling condition of the vehicle; and an acceleration vector detecting device configured to detect an acceleration vector of the vehicle in a horizontal plane, with the wheel position control device being further configured to change wheel positions of at least one of the wheels based on a direction of the acceleration vector that was detected, the wheel position control device being further configured to divide the wheels into a first group on one side of the acceleration vector and a second group on an opposite side of the acceleration vector, and the wheel position control device being further configured to change the wheel positions of the wheels based on distances between the wheels of each of the first and second groups.

17. A variable wheel positioning vehicle comprising:

vehicle body means for forming a vehicle cabin with a center of gravity;

wheel means for rotatably supporting with respect to the vehicle body means;

wheel position changing means for horizontally moving the wheel means along a movement path with respect to the vehicle body means about a center point located near the center of gravity of the vehicle body means and to hold the wheel means at any position along the movement path, the movement path having an axis at the center point; and wheel position control means for controlling the wheel position changing means to change a wheel positioning distance between a center rotation axis of the wheel means and the center of gravity of the vehicle body means as measured in a direction parallel to an acceleration direction of the center of gravity of the vehicle body means based on a traveling condition of the vehicle, the wheel position control device being configured to select at least one of the wheels that is closest to the acceleration direction of the center of gravity as a base wheel to be held fixed and to change wheel positions of selected remaining ones of the wheels upon the wheel position control device changes the wheel positions.

* * * * *